(12) United States Patent
Simard et al.

(10) Patent No.: US 10,479,290 B2
(45) Date of Patent: Nov. 19, 2019

(54) REMOVABLE CONTAINER FOR A VEHICLE

(71) Applicant: BOMBARDIER RECREATIONAL PRODUCTS INC., Valcourt (CA)

(72) Inventors: Mikhael Simard, St-Joachim-de-Shefford (CA); Stephane Veillette, Ste-Genevieve-de-Batiscan (CA); Dany Bernier, Sherbrooke (CA); Dave Proulx, Sherbrooke (CA); Matt Tandrup, Bromont (CA)

(73) Assignee: BOMBARDIER RECREATIONAL PRODUCTS INC., Valcourt (FR)

( * ) Notice: Subject to any disclaimer, the term of this patent is extended or adjusted under 35 U.S.C. 154(b) by 18 days.

(21) Appl. No.: 15/748,850

(22) PCT Filed: Sep. 18, 2015

(86) PCT No.: PCT/IB2015/057218
§ 371 (c)(1),
(2) Date: Jan. 30, 2018

(87) PCT Pub. No.: WO2017/017508
PCT Pub. Date: Feb. 2, 2017

(65) Prior Publication Data
US 2018/0222403 A1  Aug. 9, 2018

Related U.S. Application Data

(60) Provisional application No. 62/198,874, filed on Jul. 30, 2015.

(51) Int. Cl.
*B60R 7/06* (2006.01)
*B60R 11/06* (2006.01)
(Continued)

(52) U.S. Cl.
CPC .............. *B60R 11/06* (2013.01); *B60R 7/043* (2013.01); *B60R 7/06* (2013.01); *B60R 2011/0005* (2013.01)

(58) Field of Classification Search
CPC .. B60R 7/06; B60R 7/08; B60R 7/043; B60R 9/02; B60R 11/06; B60R 2011/0005
See application file for complete search history.

(56) References Cited

U.S. PATENT DOCUMENTS 5,121,959 A   6/1992  King
5,472,110 A  12/1995  Boyd et al.
(Continued)

FOREIGN PATENT DOCUMENTS

RU        126662 U1    4/2013
RU        144087 U1    8/2014
WO    20150114604 A1   8/2015

OTHER PUBLICATIONS

Search Report Issued by the Russian Patent Office in connetion with the corresponding application No. 2018107034, dated Nov. 8, 2018.
(Continued)

*Primary Examiner* — Lori L Lyjak
(74) *Attorney, Agent, or Firm* — BCF LLP

(57) ABSTRACT

A container assembly for a vehicle having a container receiving base having one of a catch and a catch receiving space and a removable container selectively disposed on the container receiving base, the removable container having a container body defining an item receiving space, and a handle pivotally connected to the container body and being movable between a locked and an unlocked position, the handle having an other one of the catch and the catch receiving space, the other one of the catch and the catch receiving space being movable with the handle, where in the locked position, the catch is received in the catch receiving space, preventing separation of the container from the base
(Continued)

and in the unlocked position, the catch is out of the catch receiving space, allowing separation of the container from the base. A removable container and a vehicle incorporating the container assembly are also disclosed.

20 Claims, 21 Drawing Sheets

(51) Int. Cl.
*B60R 7/04* (2006.01)
*B60R 11/00* (2006.01)

(56) References Cited

U.S. PATENT DOCUMENTS

| | | |
|---|---|---|
| 5,642,845 A | 7/1997 | Van Kooten |
| 5,855,310 A | 1/1999 | Van Ert et al. |
| 5,904,269 A * | 5/1999 | Wolff ................. B65D 25/2852 220/756 |
| 5,924,616 A | 7/1999 | Shives |
| 6,547,299 B2 | 4/2003 | Atanasiu et al. |
| 7,874,587 B2 | 1/2011 | Miki |
| 2006/0061117 A1 | 3/2006 | Lester et al. |
| 2009/0084786 A1* | 4/2009 | Claypool ................ A47F 3/145 220/254.9 |
| 2012/0080432 A1* | 4/2012 | Bensman ............... B25H 3/023 220/324 |

OTHER PUBLICATIONS

Abstract of RU126662U1 and English translation thereof retrieved from https://worldwide.espacenet.com/on dated Nov. 28, 2018.
Abstract of RU144087U1 and English translation thereof retrieved from https://worldwide.espacenet.com/on dated Nov. 28, 2018.
International Search Report of PCT/IB2015/057218; Blaine R. Copenheaver; dated Jan. 8, 2016.

* cited by examiner

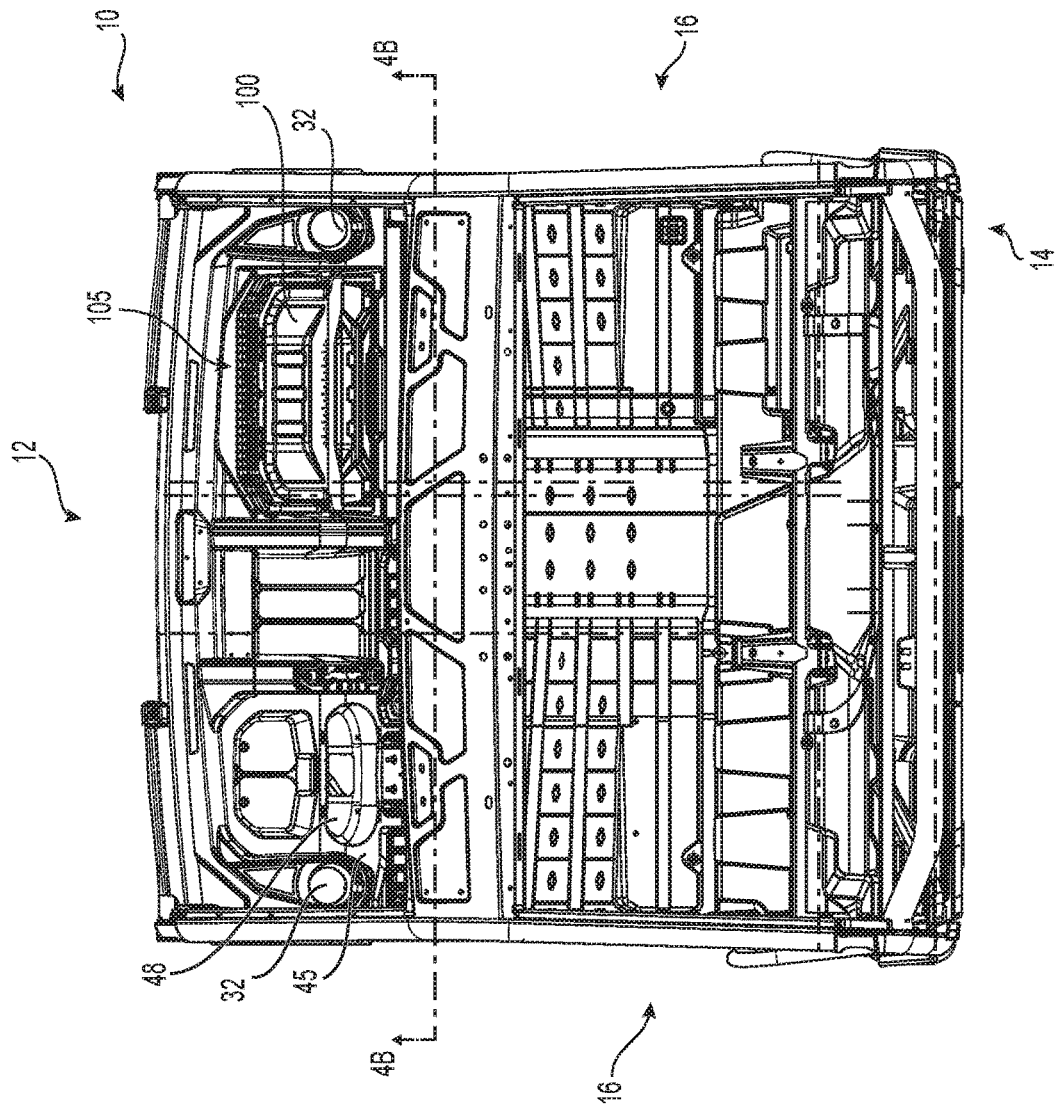

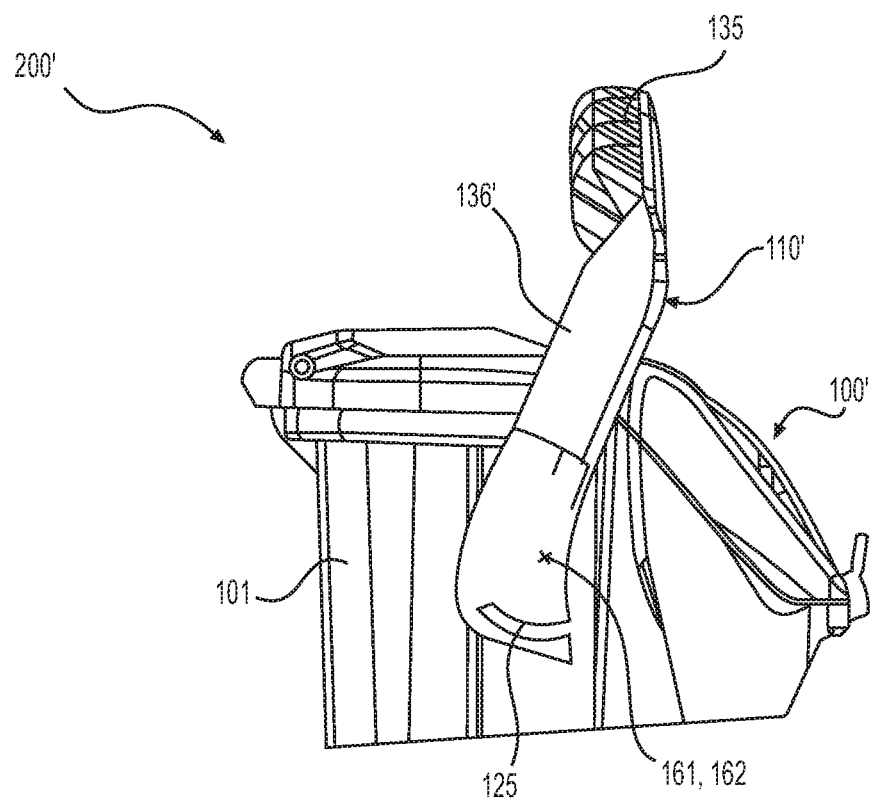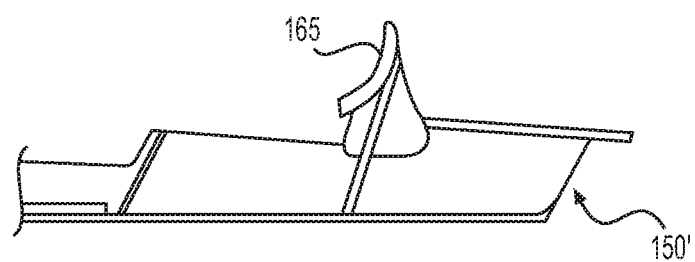
FIG. 18A

REMOVABLE CONTAINER FOR A VEHICLE

CROSS-REFERENCE

The present application claims priority to U.S. Provisional Patent Application No. 62/198,874, filed Jul. 30, 2015, the entirety of which is incorporated herein by reference.

TECHNICAL FIELD

The present technology relates to a removable container for a vehicle and a vehicle incorporating a removable container.

BACKGROUND

Side-by-side vehicles (SSVs) are off-road vehicles that often confront difficult terrain and adverse weather conditions and thus routine or emergency mechanical maintenance may become necessary while a user is out away from home or a repair facility. As such, it is desirable to be able to transport the necessary tools, for instance in a toolbox, in order to perform these repairs or adjustments. In view of the operating conditions of SSVs, typically rough, unpaved terrain, a toolbox or similar container should be properly secured. However, when needing to perform adjustments or repairs in the field, many tools are often needed, so a toolbox or similar container should not be permanently secured to the vehicle. As such, it is desirable to have a container configured to securely contain and transport tools on an SSV or similar vehicle, while having the container also be removable such that the entirety of its contents can be displaced efficiently.

SUMMARY

It is an object of the present to ameliorate at least some of the inconveniences present in the prior art.

According to one aspect of the present technology, there is provided a container having a container body defining an item receiving space, a handle pivotally connected to the container body and being movable between a locked position and an unlocked position, the handle having one of at least one catch and at least one catch receiving space, the one of the at least one catch and the at least one catch receiving space being movable with the handle and being configured to secure the removable container to a container receiving base when the handle is in the locked position.

In some implementations, the one of the at least one catch and the at least one catch receiving space is the at least one catch.

In some implementations, the at least one catch is two catches, the two catches being disposed on opposite sides of the container body.

In some implementations, the container has a lid operatively connected to the container body, movable between an open position providing access to the item receiving space and a closed position preventing access to the item receiving space.

In some implementations, the lid is hinged to the container body.

In some implementations, the handle is pivotally connected to two opposite sides of the container body.

In some implementations, the container has at least one handle stopper disposed on the container body.

In some implementations, the at least one catch has an arcuate portion.

In some implementations, the at least one catch has a protrusion at an end of the arcuate portion configured to lock the handle in place when engaged with the container receiving base.

In some implementations, when the handle is in the unlocked position, a portion of the handle extends over a top side of the container body.

In some implementations, when the handle is in the locked position, a portion of the handle is disposed to one of a front and a rear of the container body.

In some implementations, the container body has a ramp disposed on a side wall of the container body, the handle moving over the ramp when the handle is moved between the locked and the unlocked positions.

According to another aspect of the present technology, there is provided a container assembly for a vehicle having a container receiving base having one of at least one catch and at least one catch receiving space and a removable container selectively disposed on the container receiving base, the removable container having a container body defining an item receiving space and a handle pivotally connected to the container body and being movable between a locked position and an unlocked position, the handle having an other one of the at least one catch and the at least one catch receiving space, the other one of the at least one catch and the at least one catch receiving space being movable with the handle, where in the locked position, the at least one catch is received in the at least one catch receiving space, preventing the separation of the removable container from the container receiving base and in the unlocked position, the at least one catch is out of the at least one catch receiving space, allowing separation of the removable container from the container receiving base.

In some implementations, the one of the at least one catch and the at least one catch receiving space is the at least one catch receiving space, the at least one catch receiving space being defined in part by at least one receiving hook and the other one of the at least one catch and the at least one catch receiving space is the at least one catch.

In some implementations, the container assembly has a lid operatively connected to the container body and being movable between an open position providing access to the item receiving space and a closed position preventing access to the item receiving space.

In some implementations, the at least one catch is two catches disposed on opposite sides of the container body.

In some implementations, the at least one catch has an arcuate portion.

In some implementations, the at least one catch has a protrusion at an end of the arcuate portion configured to lock the handle in place when engaged with the at least one receiving hook.

In some implementations, the container receiving base is a receptacle.

In some implementations, the handle is pivotally connected to two opposite sides of the container body.

In some implementations, the container assembly has at least one handle stopper disposed on the container body.

In some implementations, when the handle is in the unlocked position, a portion of the handle extends over a top side of the container body.

In some implementations, when the handle is in the locked position, a portion of the handle is disposed to one of a front and a rear of the container body.

According to yet another aspect of the present technology, there is provided a vehicle having a vehicle body, at least one seat connected to the vehicle body, a motor connected to the vehicle body, a container receiving base connected to the vehicle body, the container receiving base having one of at least one catch and at least one catch receiving space and a removable container selectively disposed on the container receiving base, the removable container having a container body defining an item receiving space, a handle pivotally connected to the container body and being movable between a locked position and an unlocked position, the handle having an other one of the at least one catch and the at least one catch receiving space, the other one of the at least one catch and the at least one catch receiving space being movable with the handle, where in the locked position, the at least one catch is received in the at least one catch receiving space, preventing the separation of the removable container from the container receiving base and in the unlocked position, the at least one catch is out of the at least one catch receiving space, allowing separation of the removable container from the container receiving base.

In some implementations, the one of the at least one catch and the at least one catch receiving space is the at least one catch receiving space, the at least one catch receiving space being defined in part by at least one receiving hook and the other one of the at least one catch and the at least one catch receiving space is the at least one catch.

In some implementations, the vehicle has a dashboard connected to the vehicle body and disposed forward of the at least one seat, the dashboard defining the container receiving base.

In some implementations, the vehicle has a cargo box connected to the vehicle body, the cargo box defining the container receiving base.

In some implementations, the container receiving base is a receptacle.

In some implementations, the vehicle has a lid operatively connected to the container body and being movable between an open position providing access to the item receiving space and a closed position preventing access to the item receiving space.

In some implementations, when the handle is in the unlocked position, a portion of the handle extends over a top side of the container body.

In some implementations, when the handle is in the locked position, a portion of the handle is disposed to one of a front and a rear of the container body.

In some implementations, the vehicle has at least one handle stopper disposed on the container body.

In some implementations, the at least one catch is two catches, the two catches being disposed on opposite sides of the container body.

In some implementations, the at least one catch has an arcuate portion.

In some implementations, the at least one catch has a protrusion at an end of the arcuate portion configured to lock the handle in place when engaged with the at least one receiving hook.

For the purposes of the present application, terms related to spatial orientation such as forward, rearward, front, rear, upper, lower, left, and right, are as they would normally be understood by a driver of the vehicle sitting thereon in a normal driving position with the vehicle being upright and steered in a straight ahead direction.

Should there be any difference in the definitions of term in this application and the definition of these terms in any document included herein by reference, the terms as defined in the present application take precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4A is a top plan view of a portion of the cockpit area the vehicle of FIG. 1, showing a dashboard and a removable container;

FIG. 18A is a left side elevation view of a removable container assembly in accordance with another implementation of the present technology, with the removable container removed from the container receiving base;

DETAILED DESCRIPTION

The present technology will be described herein with respect to a side-by-side vehicle (SSV) designed to accommodate three riders (one driver and two passengers) seated side-by-side in an open cockpit area. However, it is contemplated that at least some aspects of the present technology could be adapted for use on other kinds of vehicles such as, but not limited to, SSVs designed to accommodate less or more than three passengers, automobiles, trucks, recreational camping vehicles (RVs), all-terrain vehicles (ATVs), personal watercraft (PWCs), golf carts and snowmobiles. It is also contemplated that at least some aspects of the present technology could adapted for use as a removable container for non-vehicular objects, such as, but not limited to, camping trailers, barbeques and home patios.

Figure 1:
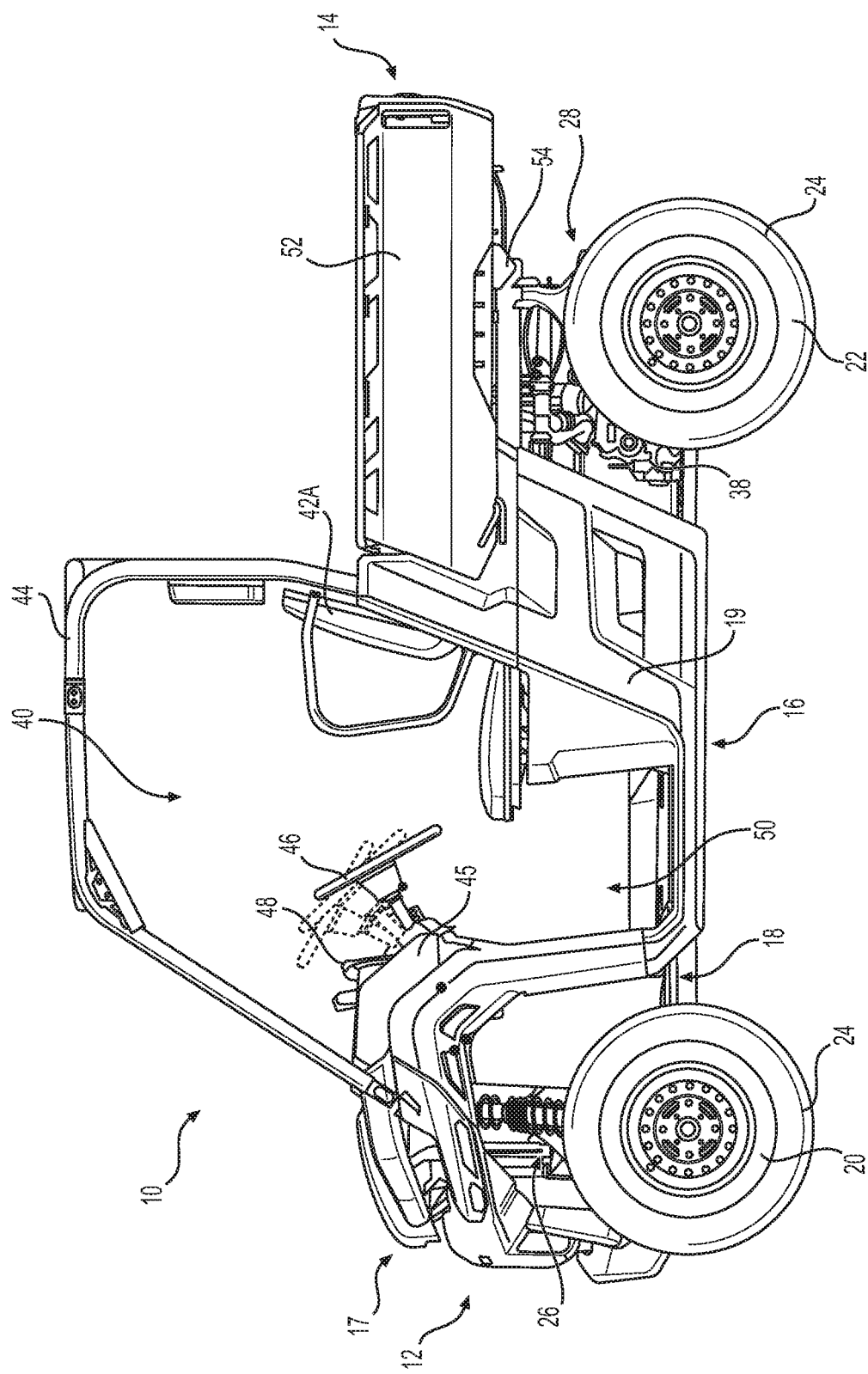
FIG. 1 is a left side elevation view of a side-by-side vehicle.
Figure 2:
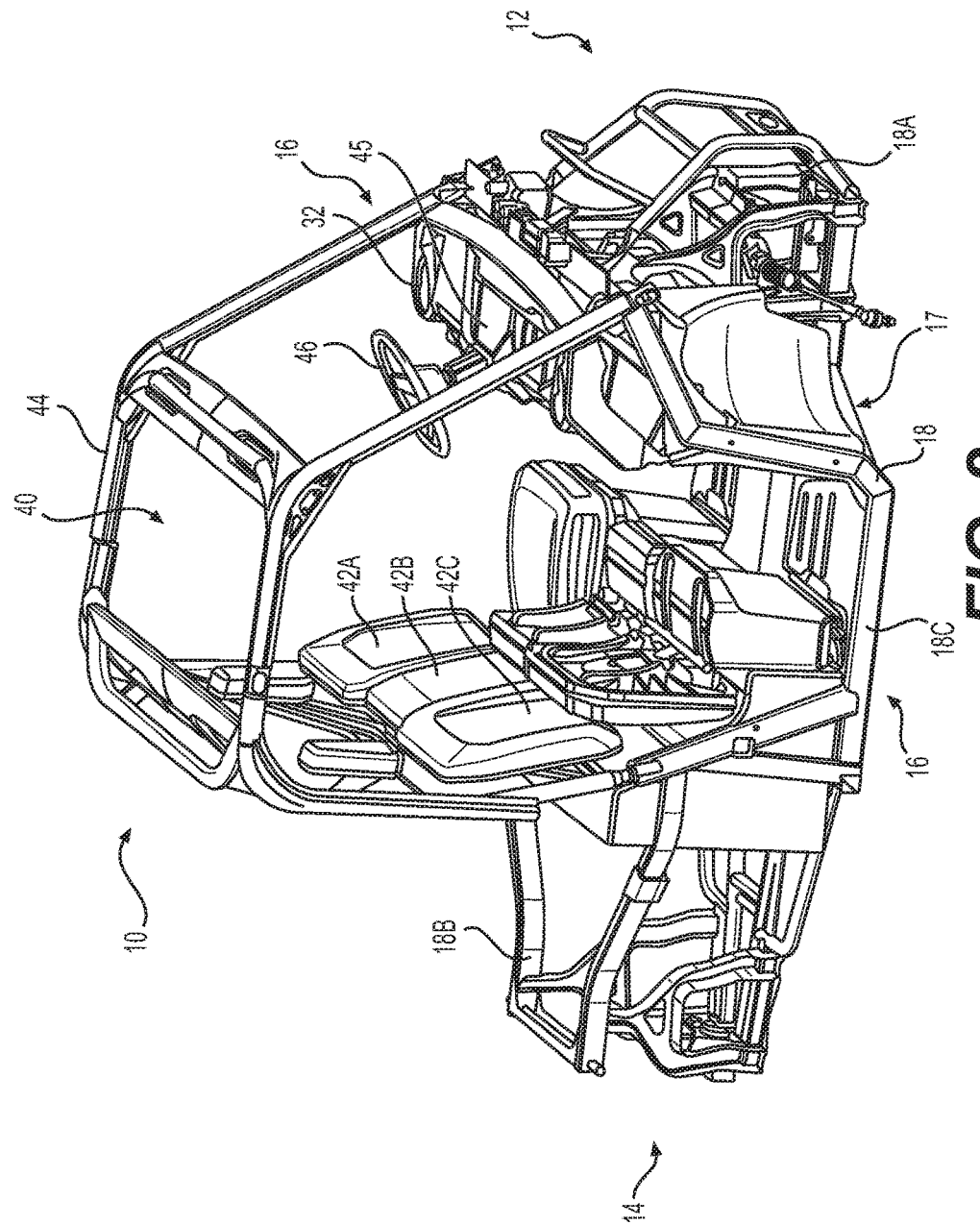
FIG. 2 is a perspective view, taken from a front, right side, of a portion of the vehicle of FIG. 1 showing part of the vehicle body and the cockpit area.

FIGS. 1 and 2 illustrate a vehicle 10 having a front end 12, a rear end 14, and left and right sides 16, defined consistently with the forward travel direction of the vehicle 10. The vehicle 10 includes a vehicle body 17, to which the other parts of the vehicle 10 are connected. The vehicle body 17 is composed of, at least, a frame 18 and at least one body panel 19. The frame 18 has a front portion 18A, a rear portion 18B and a middle portion 18C.

The vehicle 10 includes a pair of front wheels 20 and a pair of rear wheels 22 (only the left wheels 20, 22 being shown). Each of the wheels 20, 22 has a tire 24. Each front wheel 20 is suspended from the front portion 18A of the frame 18 via a front suspension assembly 26. Each rear wheel 22 is suspended from the rear portion 18B of the frame 18 via a rear suspension assembly 28.

Figure 3:
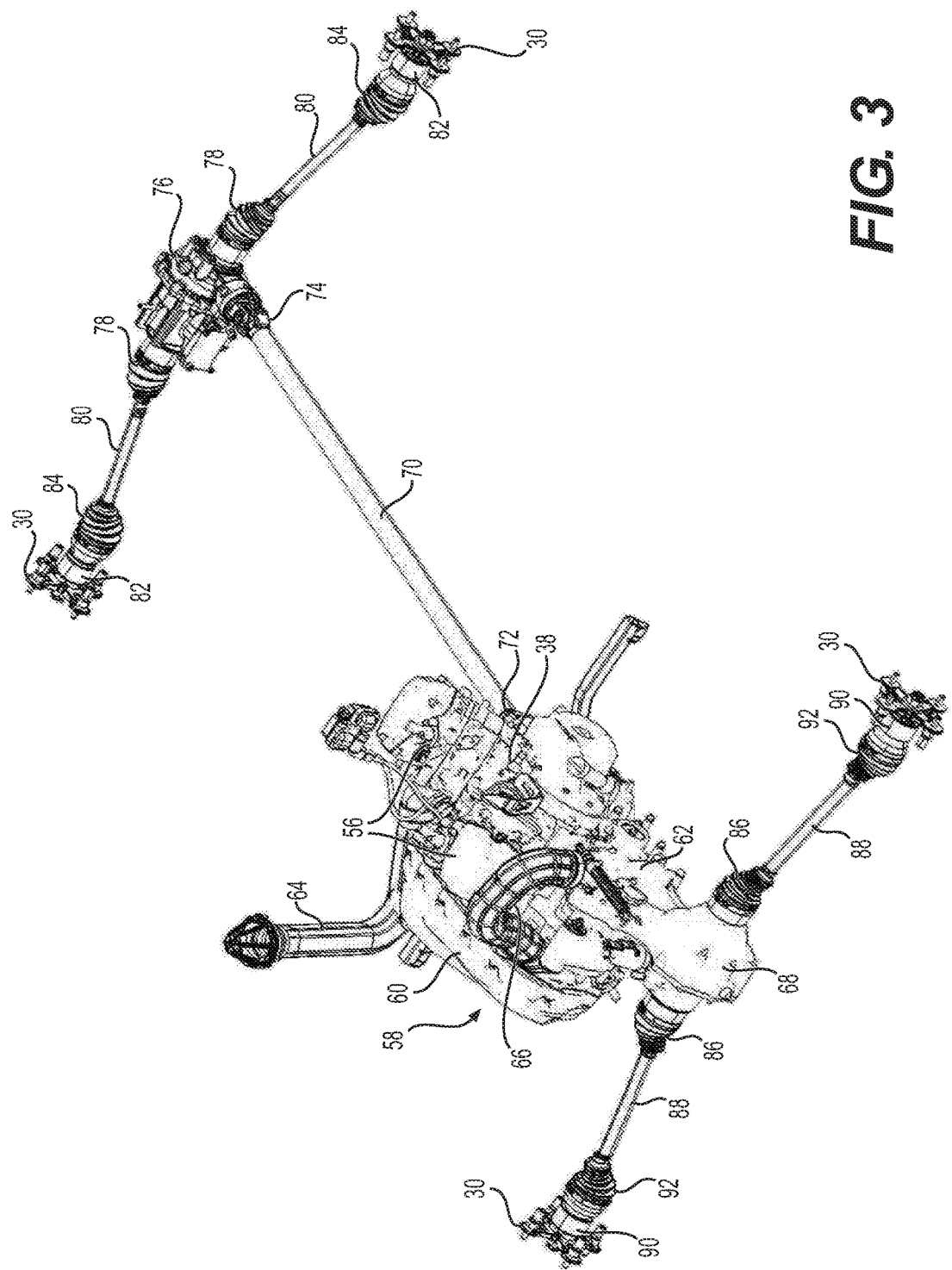
FIG. 3 is a perspective view taken from a rear, right side of a powertrain of the vehicle of FIG. 1.

Each of the wheels 20, 22 is mounted to a hub 30 (see FIG. 3). Each of the wheels 20, 22 is provided with a brake (not shown). Each brake has a brake disc (not shown) mounted to the hub 30 and a caliper (not shown) straddling the brake disc. Brake pads (not shown) are mounted to the caliper so as to be disposed between the caliper and the brake disc on either side of the brake disc. The caliper is hydraulically actuated by a hydraulic piston connected to a hydraulic cylinder (not shown) via brake lines (not shown). The hydraulic cylinder is connected to and actuated by a foot operated brake pedal (not shown) such that when the brake pedal is actuated, hydraulic pressure is applied to the hydraulic cylinder and thereby to the piston of the caliper, causing the brake pads to squeeze the brake disc which, through friction, brakes the wheel 20 or 22. The calipers of the front and rear brakes are mounted to the front and rear suspension assemblies 26, 28 respectively. The front and rear wheels 20, 22 are connected to an engine 38 (FIG. 3) as will be described in greater detail below.

Figure 4B:
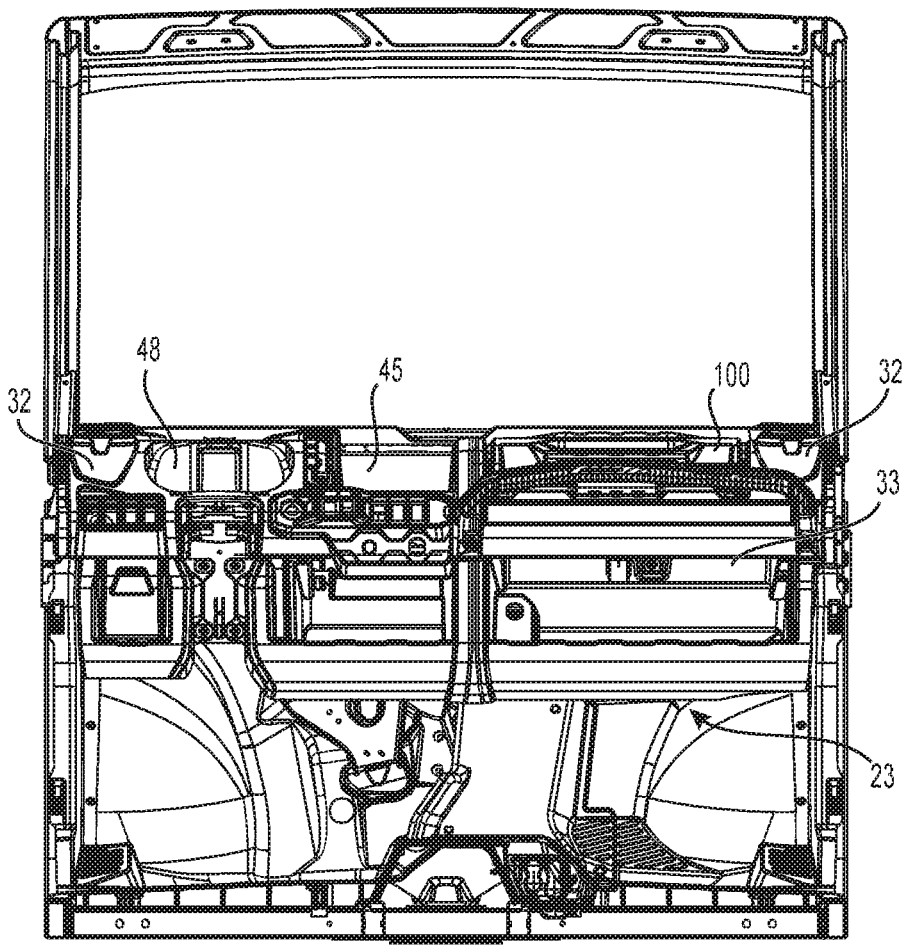
FIG. 4B is a cross-sectional view of the portion of the cockpit area of the vehicle of FIG. 4A, taken along the line 4B-4B of FIG. 4A.

The vehicle 10 has an open-air cockpit area 40 disposed generally in the middle portion of the vehicle 10. The cockpit area 40 is defined at its front by at least a front wall 23 (see FIG. 4B). The cockpit area 40 has a left seat 42A to accommodate a driver of the vehicle 10, and a middle seat 42B and a right seat 42C to accommodate two passengers (collectively referred to herein as riders). It is contemplated that the vehicle 10 could have only the left seat 42A and the right seat 42C. As the left seat 42A, the middle seat 42B and the right seat 42C are distributed laterally, the vehicle 10 is referred to as a side-by-side vehicle, or SSV. It is contemplated that the vehicle 10 could have one or more additional rows of seats. The seat bottoms of the middle seat 42B and the right seat 42C can be tilted up to provide access to storage disposed under these seats, as shown in FIG. 2. It is contemplated that the seat bottoms of one or more of these seats could be fixed. The seat bottom of the left seat 42A is fixed, but it is contemplated that it could also be tilted up. A roll cage 44, connected to the frame 18, is disposed over the cockpit area 40.

A steering assembly, including a steering wheel 46, is disposed in front of the left seat 42A. The steering assembly is operatively connected to the two front wheels 20 to permit steering of the vehicle 10. As can be seen from the dotted lines in FIG. 1, the position of the steering wheel 46 can be adjusted. It is contemplated that the steering wheel 46 could have only a single fixed position. A dashboard 45 is attached to an upper portion of the front wall 23. A glove box 33 is provided in the dashboard 45. A display cluster 48 is mounted to the dashboard 45, forward of the steering wheel 46. The display cluster 48 includes a number of screens and dials for the operation of the vehicle, such as a speedometer, odometer, engine speed indicator, fuel gauge, an engine temperature gauge, and the like.

The cockpit area 40 has openings 50 on the left and right sides 16 of the vehicle 10 through which the riders can enter and exit the vehicle 10. It is contemplated that a lateral cover and/or a door could be selectively disposed across each opening 50. The lateral covers/doors would be disposed across the openings 50 when the riders are riding the vehicle 10 and could be opened by the driver and/or passenger when they desire to enter or exit the cockpit area 40.

A cargo box 52 is pivotally connected to the rear portion 18B of the frame 18 rearward of the seats. The cargo box 52 is generally rectangular and opened at the top. It is contemplated that the cargo box 52 could have a top cover, and could have a different shape than that shown herein. The front end of the cargo box 52 is secured to the rear portion 18B of the frame 18 by latches (not shown) connected between the cargo box 52 and the frame 18. The rear end of the cargo box 52 extends rearward of the rear portion 18B of the frame 18 and of the rear wheels 22. The cargo box 52 has a pair of brackets 54 (only the left bracket 54 being shown in FIG. 1) extending downwards from its lower surface. The brackets 54 pivotally connect the cargo box 52 to the rear portion 18B of the frame 18 such that the front end of the cargo box 52 can be pivoted upwards to access the engine 38 and other internal components of the vehicle 10 located thereunder, or to unload the contents of the cargo box 52. A pneumatic piston (not shown) extends between the rear portion 18B of the frame 18 and the lower surface of the cargo box 52 in order to pivot the cargo box 52 and to support the cargo box 52 in its pivoted position. It is contemplated that the cargo box 52 could be fixed. It is also contemplated that the cargo box 52 could be omitted.

The powertrain of the vehicle 10 and components associated with the powertrain will now be described with reference to FIGS. 1, 2 and 3. As can be seen in FIG. 1, the engine 38 is disposed longitudinally rearward of the cockpit area 40 and is mounted to the rear portion 18B of the frame 18. As will be described in more detail below, the engine 38 drives the front and rear wheels 20, 22. It is contemplate that the engine 38 could selectively switch between driving two and four of the wheels 20, 22. It is also contemplated that the engine 38 could drive only the front wheels 20 or only the rear wheels 22.

The engine 38 of the present embodiment is a four-stroke V-twin engine. Accordingly, as can be seen in FIG. 3, the engine 38 has two cylinders 56 extending at an angle from each other. The engine 38 has an output shaft (not shown) extending horizontally and laterally. It is contemplated that other types of motors could be used. For example, it is contemplated that the motor could be a two-stroke engine with in-line cylinders 56 or that the motor could be an electric motor. The engine 38 receives fuel from a fuel tank (not shown) disposed to the right of the engine 38. It is contemplated that the fuel tank could be located elsewhere on the vehicle. The engine 38 receives air via an air induction system (not shown) disposed above the fuel tank. The air induction system includes an intake manifold connected to the two cylinders 56, a throttle body connected upstream of the intake manifold, an air box connected upstream of the throttle body, and a number of air intake conduits extending between these components. An exhaust system (not shown) delivers exhaust gases from the engine 38 to the atmosphere. The exhaust system includes exhaust conduits, an exhaust manifold, and a muffler.

As can be seen in FIG. 3, a continuously variable transmission (CVT) 58 is disposed on a left side of the engine 38. The CVT 58 has a driving pulley, a driven pulley and a belt (all not shown) looped around the driving and driven pulleys to transmit torque therebetween. The driving pulley, the driven pulley and the belt are disposed inside a cover 60. The driving pulley is mounted on the output shaft of the engine 38 so as to rotate therewith. It is contemplated that the driving pulley could be connected to another shaft that is driven by the output shaft. The driven pulley is mounted on an input shaft of a transmission 62 so as to drive the input shaft and therefore the transmission 62. The transmission 62 is connected to the rear portion of the engine 38. An air intake conduit 64 is connected to the front portion of the CVT 58 for drawing cool air inside the cover 60 of the CVT 58 for cooling the CVT 58. The heated air inside the cover 60 of the CVT 58 is released to the atmosphere by a conduit 66 connected to the rear portion of the CVT 58.

The transmission 62 transfers the torque from the CVT 38 to a front driveshaft (not shown) and a rear differential 68. The front driveshaft passes through a casing of the engine 38 and connects to another front driveshaft 70 via a universal joint 72. The front end of the front driveshaft 70 connects to another universal joint 74. The universal joint 74 connects the front driveshaft 70 to a front differential 76. The front differential 76 is connected, via left and right constant velocity joints (not shown) enclosed in flexible boots 78, to left and right front drive axles 80. The front drive axles 80 are connected to spindles 82 of the front wheels 20 via constant velocity joints (not shown) enclosed in flexible boots 84. The spindles 82 are rotatably suspended from the frame 18 by the front suspension assemblies 26. The rear differential 68 is connected, via left and right constant velocity joints (not shown) enclosed in flexible boots 86, to left and right rear drive axles 88. The rear drive axles 88 are connected to spindles 90 of the rear wheels 22 via constant velocity joints (not shown) enclosed in flexible boots 92. The spindles 90 are rotatably suspended from the frame 18 by the rear suspension assemblies 28.

Additional details on side-by-side vehicles similar to the vehicle 10 can be found in International Patent Application No. PCT/IB2015/050798, filed Feb. 2, 2015, the entirety of which is incorporated herein by reference.

A removable container assembly of the vehicle 10 will now be described with respect to FIGS. 4A to 8. The removable container assembly includes a removable container 100 selectively disposed on a container receiving base 150 defined by the dashboard 45 of the vehicle 10, forward of right seat 42C. The container receiving base 150 is configured to receive and secure the removable container 100, which will be described in more detail below. It is contemplated that the removable container 100 and container receiving base 150 could be connected to the vehicle 10 in a variety of other locations, including, but not limited to, the cargo box 52 (as will be described below with respect to FIGS. 9 and 10), under a seat, rearward of any seats and in place of a center console.

Figure 5:
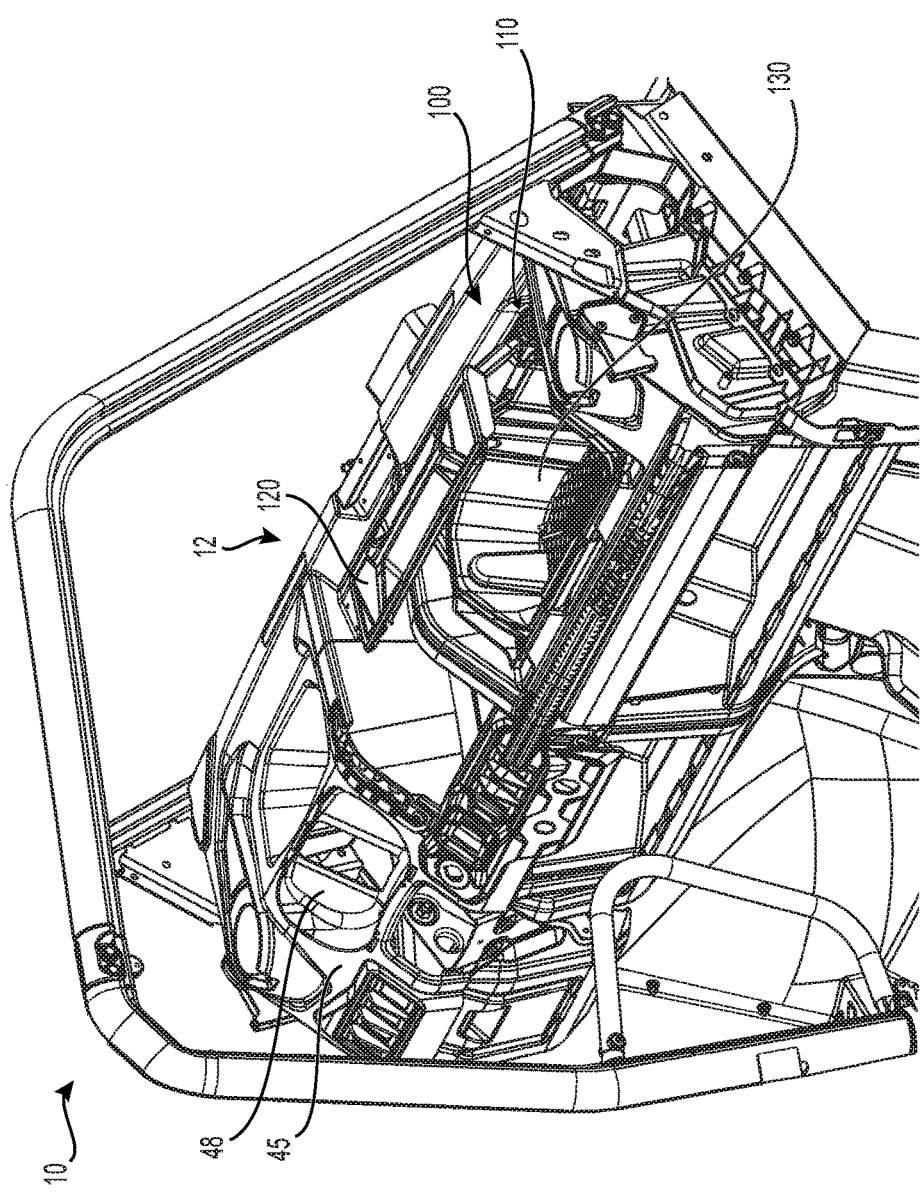
FIG. 5 is a close-up, perspective view, taken from a rear, right side of the vehicle of FIG. 1, showing the dashboard and the removable container locked onto a container receiving base, with a lid of the removable container open to show the item receiving space.
Figure 6:
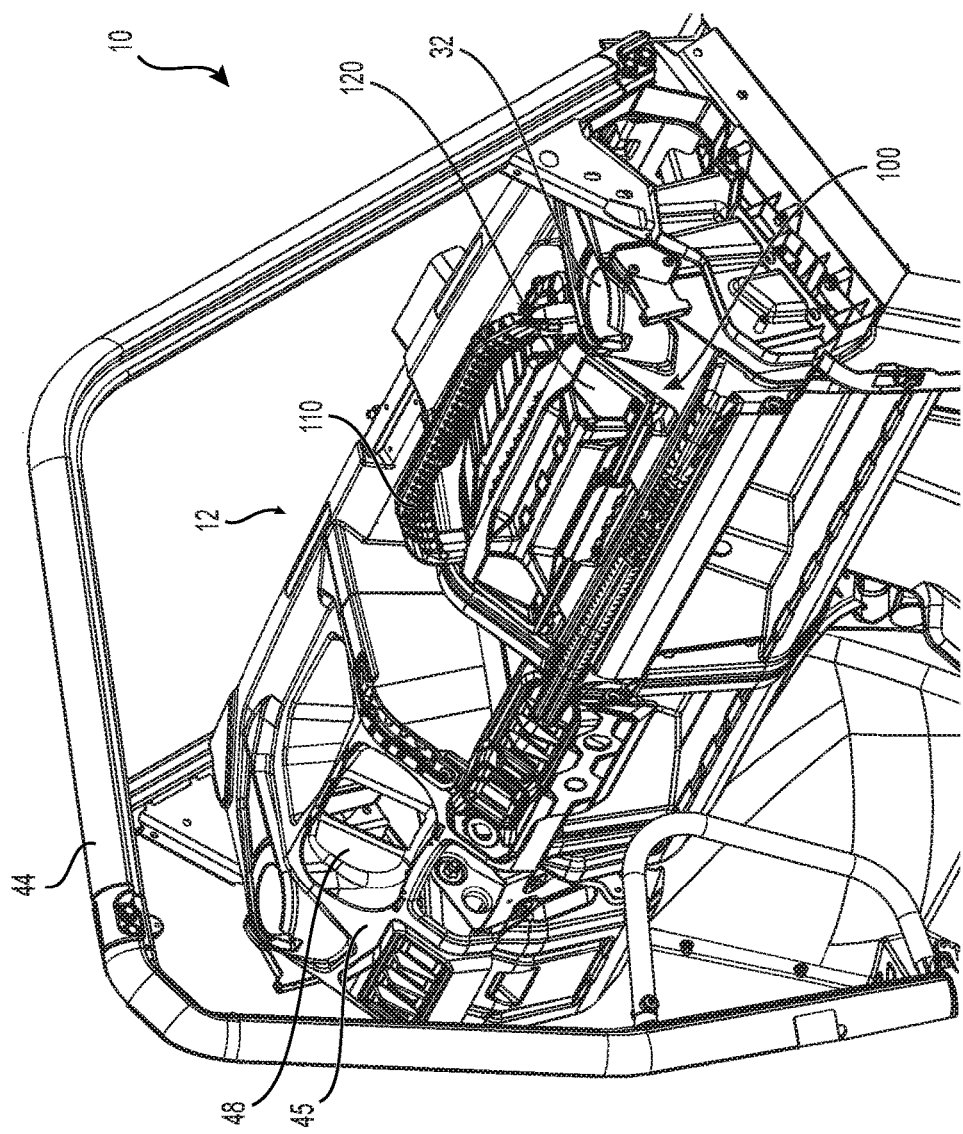
FIG. 6 is a close-up, perspective view, taken from a rear, right side of the vehicle of FIG. 1, with the removable container on the container receiving base and a handle of the container in the unlocked position.
Figure 7:
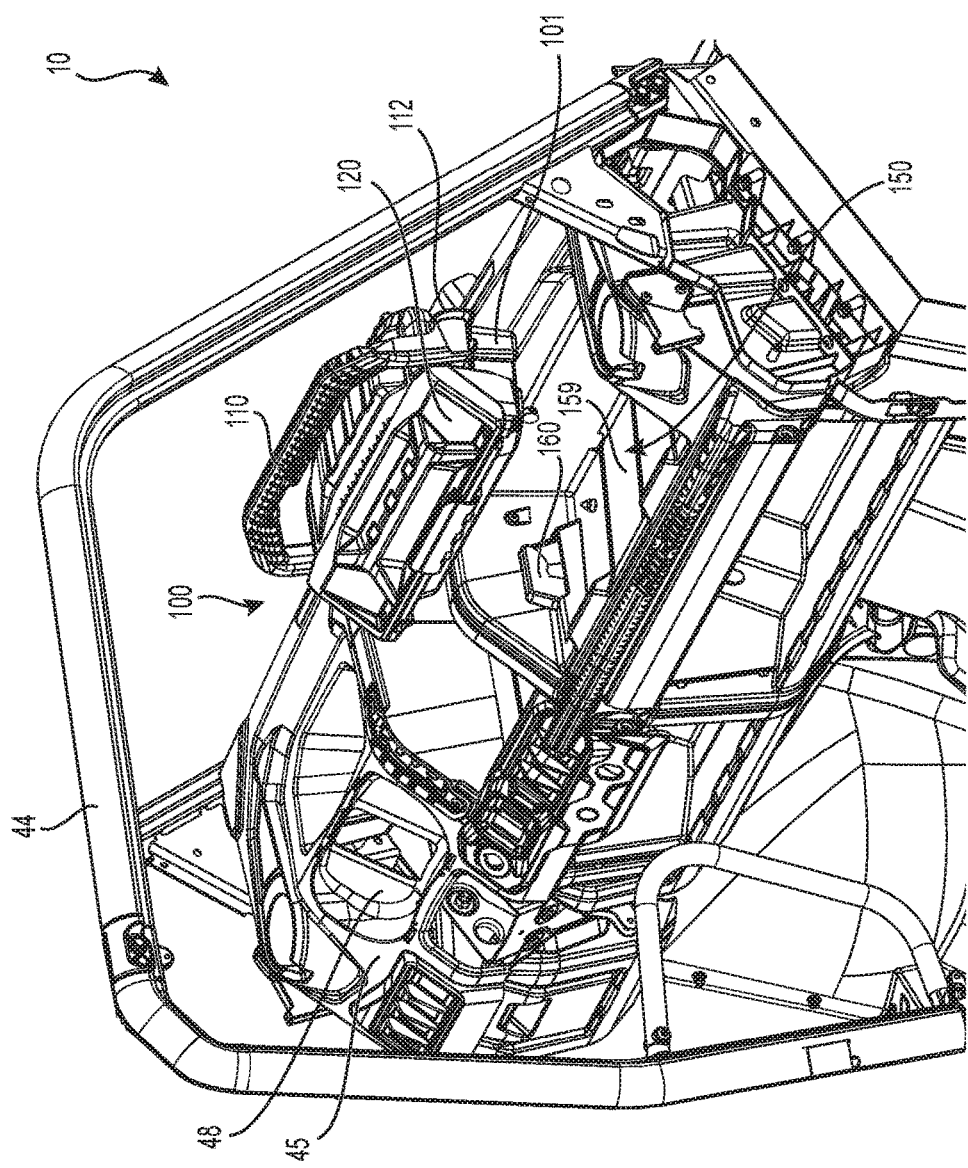
FIG. 7 is a close-up, perspective view, taken from a rear, right side of the vehicle of FIG. 1, with the removable container removed from the container receiving base, in an elevated position for clarity.

The removable container 100 has a container body 101 defining an item receiving space 130, as is illustrated in FIGS. 5 to 7. A lid 120 is attached to the container body 101 to provide access to the item receiving space 130 in an open position and to prevent access to the item receiving space 130 in a closed position. The removable container 100 also has a handle 110 to allow the user to carry or relocate the removable container 100. The handle 110 also operates the securing mechanism that locks the removable container 100 to the container receiving base 150, as will be described below in more detail.

In FIG. 5, the removable container 100 is in the container receiving base 150 defined by the dashboard 45. The handle 110 has been rotated forward to a front side 105 of the removable container 100. In this position, the removable container 100 is locked to the container receiving base 150 (the locked position). In this position, the lid 120 can be opened and is unimpeded by the handle 110. The item receiving space 130 is accessible to a user within the vehicle 10 when the lid 120 of the removable container 100 is in the open position.

In FIG. 6, the lid 120 is shut and the handle 110 has been rotated upwards to a vertical position to unlock the removable container 100 from the container receiving base 150 (the unlocked position). The removable container 100 is still disposed on the container receiving base 150, but it is no longer secured to the container receiving base 150. A user can thus extract the removable container 100 by lifting up the removable container 100 by the handle 110.

Similarly, the removable container 100 can be replaced and secured to the vehicle 10. The user places the removable container 100 onto the container receiving base 150, with the handle 110 in the unlocked position. Once on the container receiving base 150, the user then pushes the handle 110 forward to a generally horizontal position, rotating the handle 110 to the front side 105 of the removable container 100. The handle 110 is now in the locked position and the removable container 100 is now locked onto the container receiving base 150. A more detailed explanation of this process follows below.

Figure 8:
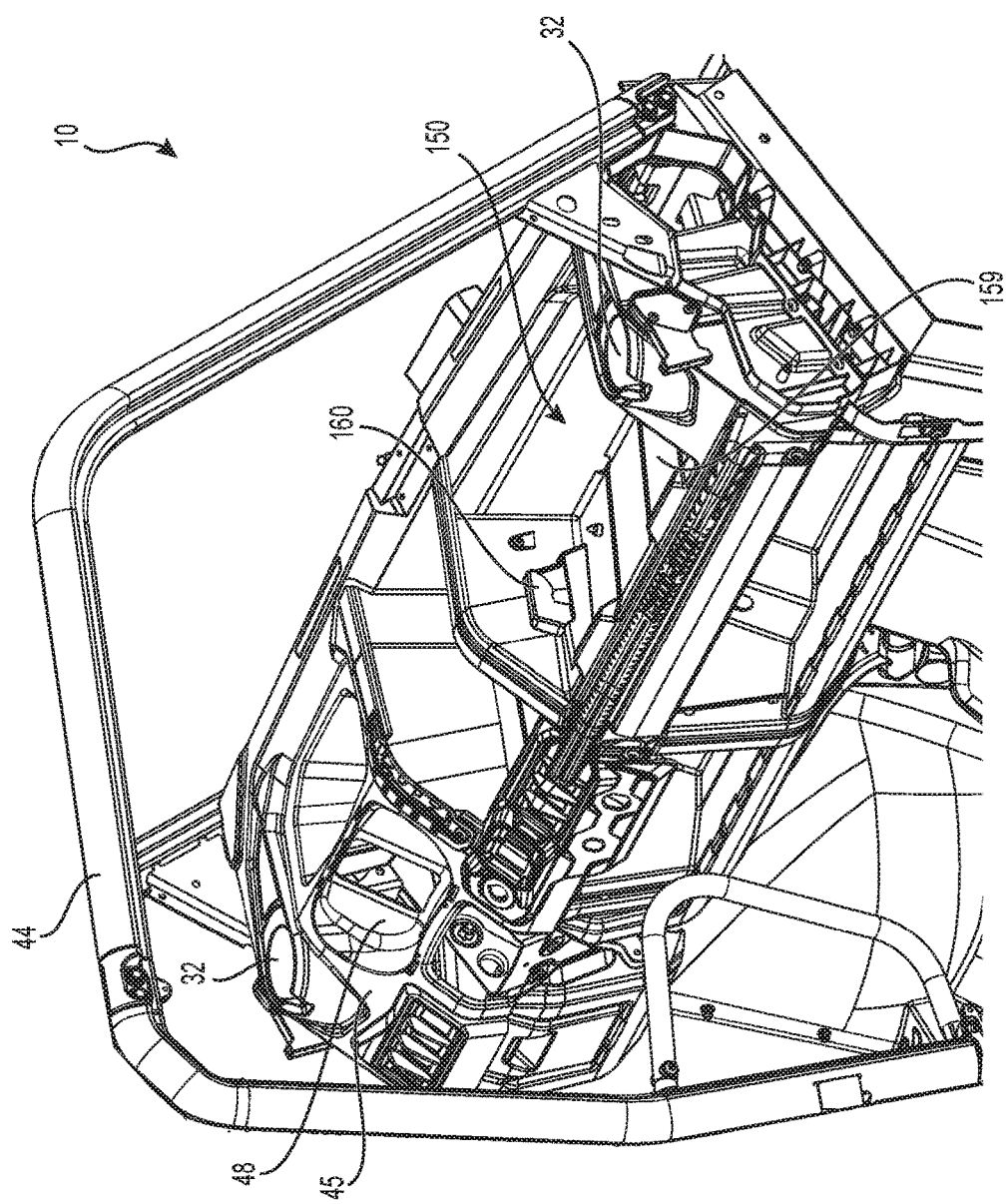
FIG. 8 is a close-up, perspective view, taken from a rear, right side of the vehicle of FIG. 1, showing the container receiving base, the removable container having been fully removed.

The removable container 100 has been removed to show the container receiving base 150 and a base interior surface 159 of the container receiving base 150 in FIGS. 7 and 8. The base interior surface 159 has ridges and recesses that conform to a bottom side 103 of the container body 101 to discourage translational movement and aid in the alignment of the removable container 100 in the container receiving base 150. It is contemplated that the base interior surface 159 may have any number of different physical features, aesthetic or functional, including, but not limited to: ridges, bumps, alignment tabs, recesses, posts and pegs.

Figure 9:
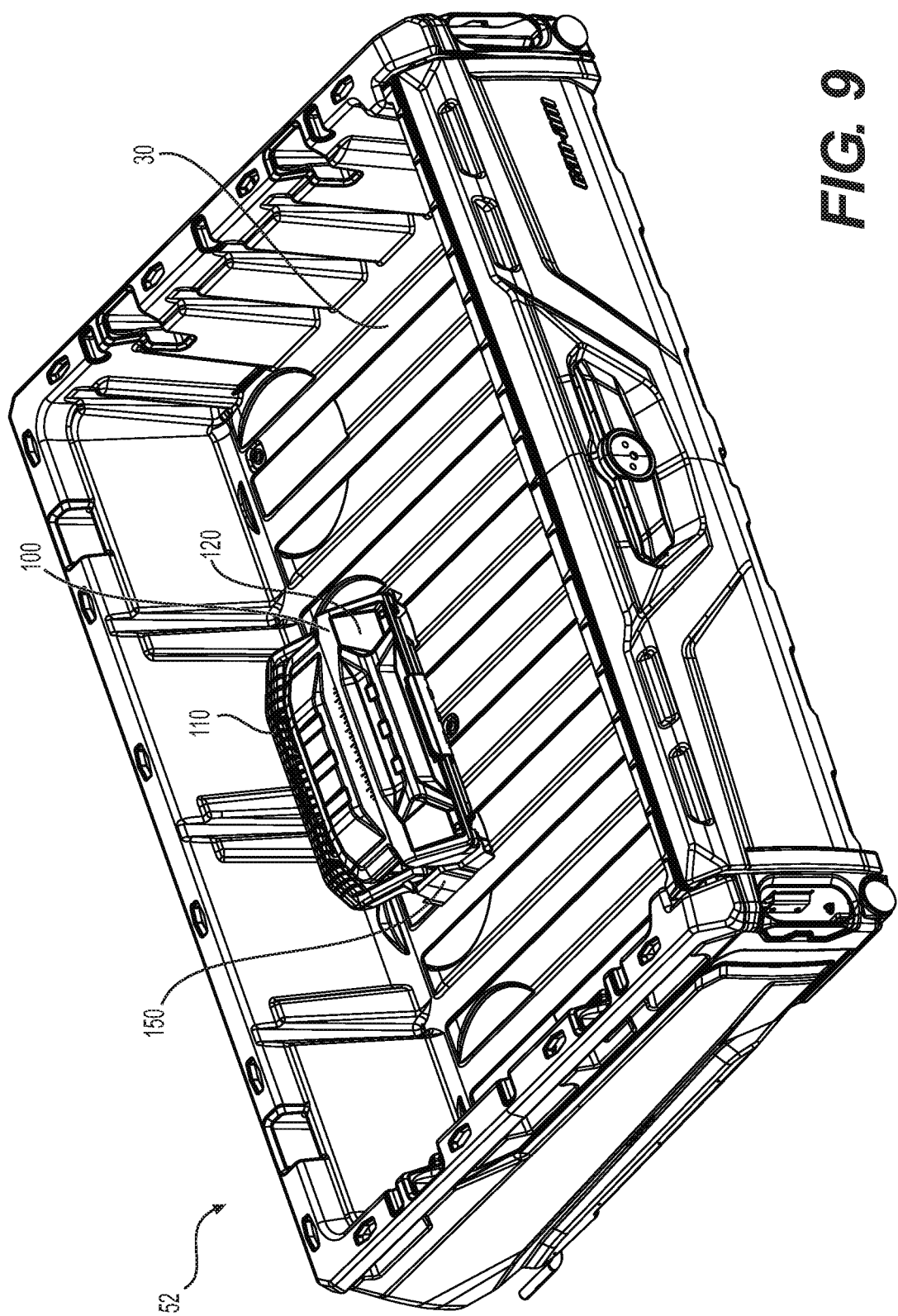
FIG. 9 is a perspective view taken from a rear, left side of a cargo box of the vehicle of FIG. 1 with the removable container connected therein.
Figure 10:
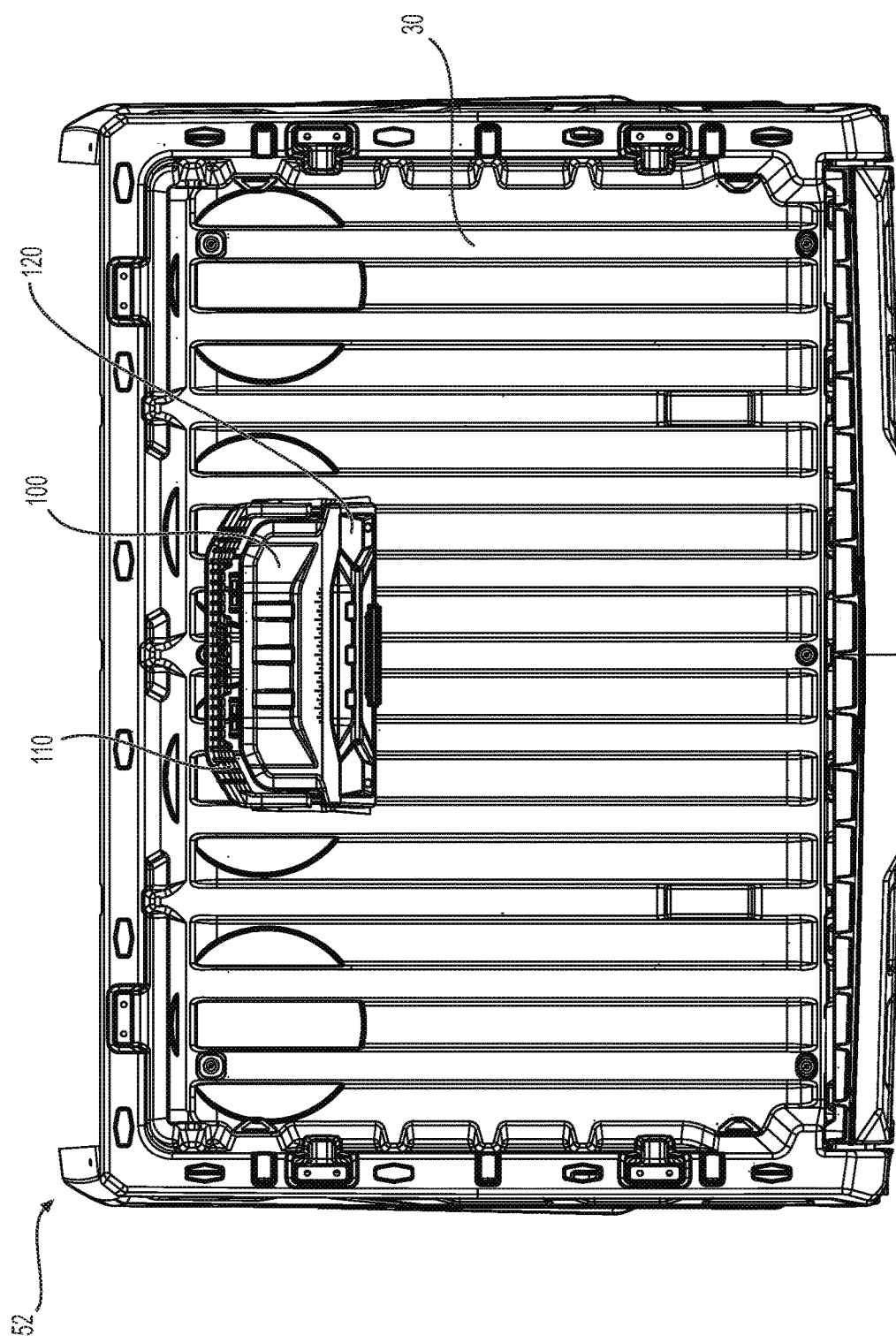
FIG. 10 is a top plan view of the cargo box and the removable container of FIG. 9.

Turning now to FIGS. 9 and 10, another implementation in accordance with the present technology is illustrated. The removable container 100 is locked to the container receiving base 150, which in this implementation is defined by the cargo box 52. The handle 110 is again stowed to the front side 105 of the removable container 100 in the locked position. This allows the lid 120 of the removable container 100 to be opened while locked into the container receiving base 150 in the cargo box 52. A user can thus access the item receiving space 130 while the removable container 100 is locked to the container base 150. A user may also remove the removable container 100 by putting the handle 110 in the unlocked position and lifting up on the handle 100, as described above.

The removable container 100 and container receiving base 150 are shown in the front, center portion of the cargo box 52, but it is contemplated that the container receiving base 150 could be located in any number of positions and orientations within the cargo box 52.

Figure 11A:
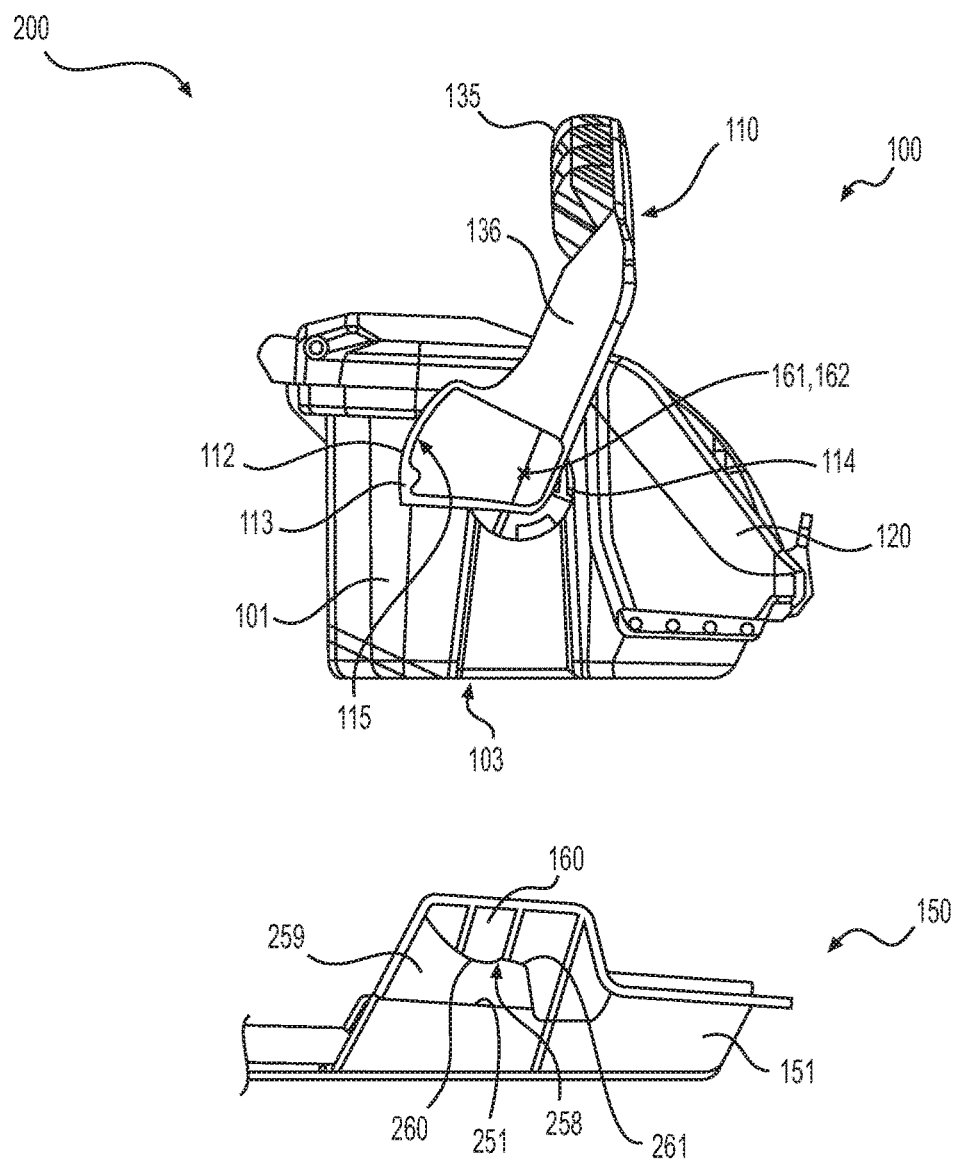
FIG. 11A is a left side elevation view of the removable container assembly of the vehicle of FIG. 1, with the removable container removed from the container receiving base.

The container assembly 200 will now be described in more detail with respect to FIGS. 11A-11C. The removable container 100 and the container receiving base 150 are two fully separable parts of the container assembly 200, as displayed in FIG. 11A. As described above, the container receiving base 150 is defined by a portion of the vehicle 10, such as the dashboard 45 or the cargo box 52. It is also contemplated that the container receiving base 150 could be defined by a non-vehicular object such as a barbeque, or could be constructed as a stand-alone object that is selectively securable to a tertiary object.

Figure 11B:
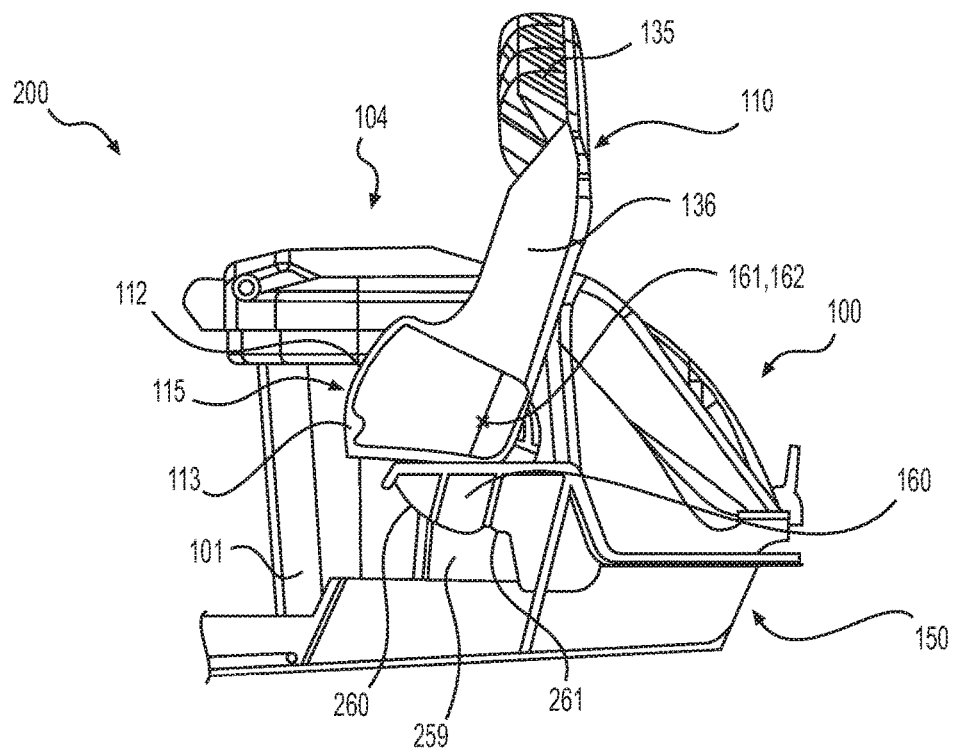
FIG. 11B is a left side elevation view of the removable container assembly with the removable container resting on the container receiving base and a handle of the removable container in the unlocked position.

In FIG. 11B, the removable container 100 has been set onto the container receiving base 150. The handle 110 is still in the unlocked position and the removable container 100 is disposed on the container receiving base 150 (but not secured thereto).

Figure 11C:
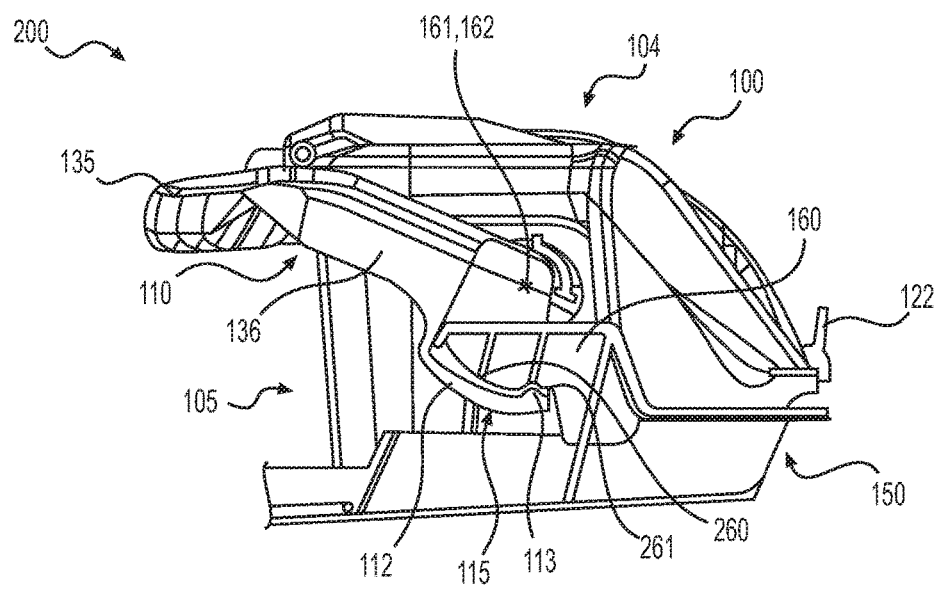
FIG. 11C is a left side elevation view of the removable container assembly, the removable container resting on the container receiving base and the handle of the removable container in the locked position.

In FIG. 11C, the removable container 100 is disposed on the container receiving base 150 and the handle 110 of the removable container 100 has been rotated forward to the front side 105 of the removable container 100 to the locked position. The removable container 100 is thus secured to the container receiving base 150.

The container receiving base 150 forms a receptacle to receive the removable container 100, with a base lip 151 surrounding the bottom portion of the removable container 100. It is contemplated that the container receiving base 150 could be a flat surface (not a receptacle). The container receiving base 150 also has a left receiving hook 160 and a right receiving hook 160 (see FIG. 16). The right receiving hook 160 is connected integrally with a right side of the container receiving base 150 and the left receiving hook 160 is connected integrally with a left side of the container receiving base 150. When the removable container 100 is on the container receiving base 150, the receiving hooks 160 are situated below the pivot points 161 of the handle 110 of the removable container 100.

Each of the receiving hooks 160 defines a catch receiving space 259, between a bottom portion 258 of the receiving hook 160 and a top portion 251 of the base lip 151. There is a right catch receiving space 259 and a left catch receiving space 259. It is contemplated that the catch receiving spaces 259 could be defined between a bottom portion of the container receiving base 150 and the receiving hook 160. Each of the right and left receiving hooks 160 also includes an arcuate portion 260 and an indented portion 261. The two receiving hooks 160 serve to help secure the removable container 100 to the container receiving base 150, as will be described in detail below.

Figure 12:
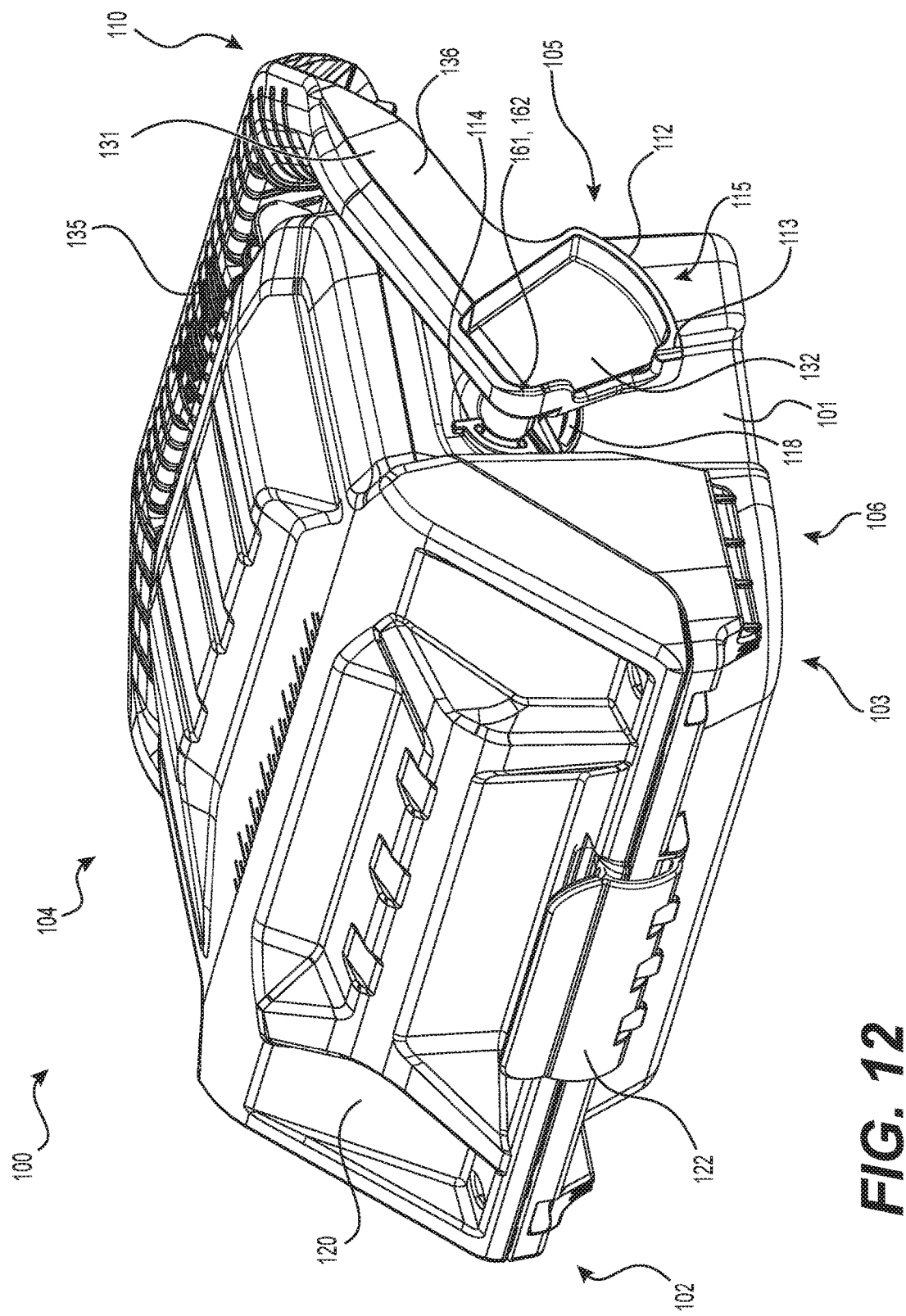
FIG. 12 is a perspective view, taken from a rear, right side, of the removable container of FIG. 11A.

The removable container 100 will now be described in greater detail with respect to FIGS. 12 to 17. The container body 101 includes a rear side 102, the bottom side 103, a top side 104, the front side 105, a right side 106 and a left side 106 defining the item receiving space 130. It is contemplated that the container body 101 could have any number of sides or have a non-rectangular form. As seen in FIGS. 12 and 14, the container body 101 has a plurality of ridges and recesses in its surface. It is contemplated that the container body 101 could have many different forms in its surface, including, but not limited to: ridges, recesses, bumps, grooves and various textures. It is also contemplated that the container body could have flat, unadorned surfaces.

Figure 13:
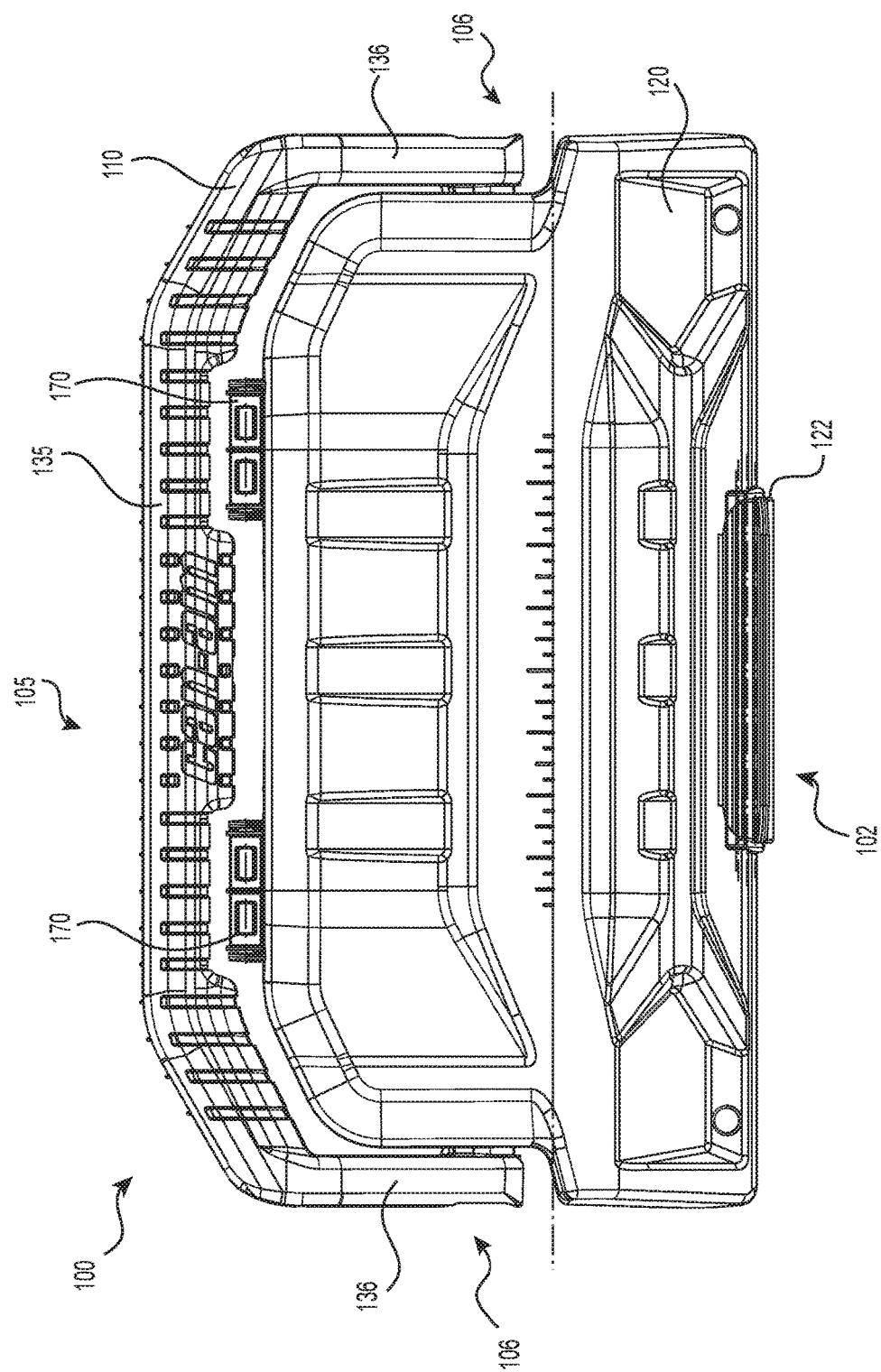
FIG. 13 is a top plan view of the removable container of FIG. 11A.
Figure 14:
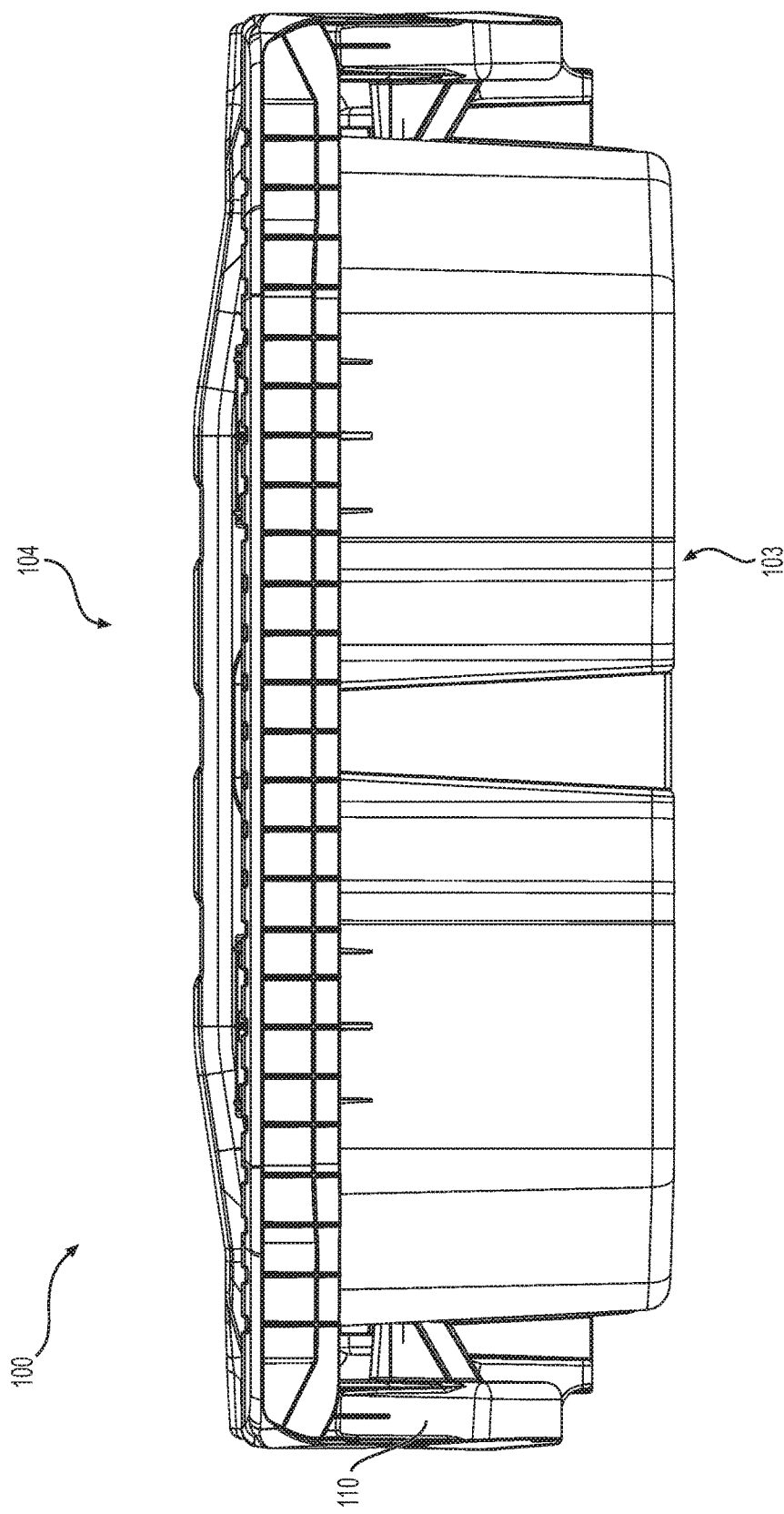
FIG. 14 is a front elevation view of the removable container of FIG. 11A.
Figure 15:
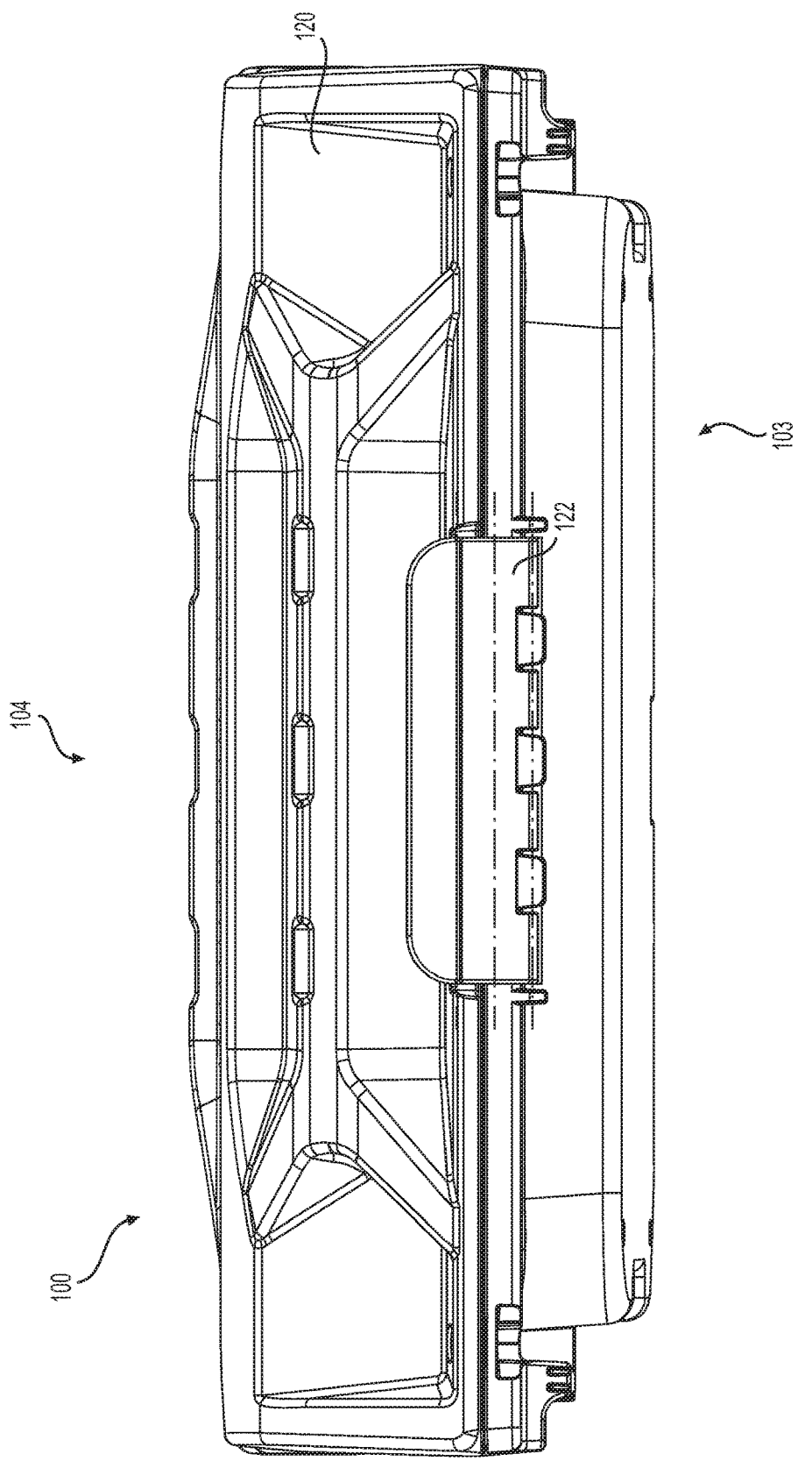
FIG. 15 is a rear elevation view of the removable container of FIG. 11A.

The lid 120 is hinged to the container body 101 via two hinges 170 located on the top side 104 the container body 101 (see FIG. 13). It is contemplated that the hinges 170 could be located on another side of the container body 101 and any number of hinges 170 could be provided. It is also contemplated that the lid 120 could be attached to the container body 101 by using other means such as, but not limited to, fasteners or by having the container body 100 and the lid 120 shaped such that the lid 120 can be manually pressed on the container body 101 and be retained thereon by a press fit. The container body 101 also includes a lid latch 122 to hold the lid 120 closed and impede entry into the item receiving space 130. It is also contemplated that the lid 120 could include other features, including but not limited to, a lid handle and a lock.

The lid 120 opens toward the front side 105 of the container 100. It is contemplated that the lid 120 could be arranged in any configuration with the container body 101, depending on many factors, including, but not limited to: the shape of the container body 101, the orientation of the handle 110 in the locked and unlocked position, and the location of the container receiving base 150 on the vehicle 10. For example, if the removable container 100 is locked onto the container receiving space 150 on the right side 16 of the vehicle 10, it may be advantageous to locate the lid 120 on the left side 106 of the container body 101.

The handle 110 has a right arm 136 and a left arm 136, and a middle portion 135 extending between the arms 136. The right arm 136 is pivotally connected to the container body 101 on the right side 106 at a right pivot point 161 and the left arm 136 is pivotally connected to the container body 101 on the left side 106 at a left pivot point 161. The handle 110 pivots about a pivot axis 162 passing through the pivot points 161.

Each of the arms 136 is generally L-shaped, see for example FIG. 12. The central portion 135 of the handle 110 is connected to an end of a leg portion 131 of the L-shaped arm 136. Each of the catches 115 is connected to an end of a foot portion 132 of the L-shaped arm 136. The leg portion 131 and the foot portion 132 meet in a portion of the arm 136 around the pivot point 161.

It is contemplated that the handle 110 could be connected to the container body 101 to any two opposite sides. It is also contemplated that the handle 110 could be connected to only one side of the container body 101. It is further contemplated that the arms 136 of the handle 110 could have any number of different shapes.

In the unlocked position, the central portion 135 of the handle 110 is located over the top side 104 of the container body 101 and the right and left arms 136 are generally vertical. A user can take hold of the central portion 135 of the handle 110 to lift or displace the removable container 100 and any contents therein.

In the locked position, the central portion 135 of the handle 110 is located next to the front side 105 of the container body 101 and the right and left arms 136 are at an acute angle with respect to horizontal. With the central portion 135 of the handle 110 pushed back away from the top side 104, the lid 120 can be opened while the removable container 100 is locked to the container receiving base 150 (as shown in FIG. 5) without being impeded by the handle 110.

It is contemplated that the handle 110 could be differently disposed or oriented in the locked and unlocked positions. Different handle configurations could include, but are not limited to, the central portion 135 being rearward of the container body 101 in the locked position, the right and left arms 135 being at an angle between the top side 104 and the rear side 102 in the locked or unlocked position and the right and left arms 135 being at an angle between the top side 104 and the front side 105 in the locked or unlocked position. The choice of handle 110 configuration could depend on many factors, including but not limited to: the shape of the container body 101, the location of the container receiving base 150 on the vehicle 10 and the configuration of the lid 120 on the container body 101.

It is also contemplated that the handle 110 could be moved between the locked and unlocked positions by methods other than rotation. These methods could include, but are not limited to, translating the handle 110 between the locked and unlocked positions.

The handle 110 has a series of ridges for grip along the central portion 135. It is contemplated that the central portion 135 of the handle 110 could be of many different forms, either aesthetic or functional, including, but not limited to: padded, smooth, undulating and ergonomic, in any range of materials. The choice of physical form of the handle 110 and the central portion 135 of the handle 110 could be based on, but is not limited to: user ease, environmental conditions of standard use, commercial interests and production cost.

The handle 110 of the removable container 100 has a left catch 115 connected to and movable with the left arm 136 and a right catch 115 connected to and movable with the right arm 136. Each of the right catch 115 and the left catch 115 has an arcuate portion 112. Each of the arcuate portions 112 has a shape of a circular segment having a center coincident with their respective pivot points 161. Each of the right catch 115 and the left catch 115 also has a protrusion 113 at a rear end of its arcuate portion 112. The utility of the catches 115, the arcuate portions 112 and the protrusions 113 will be described in detail below.

Figure 16:
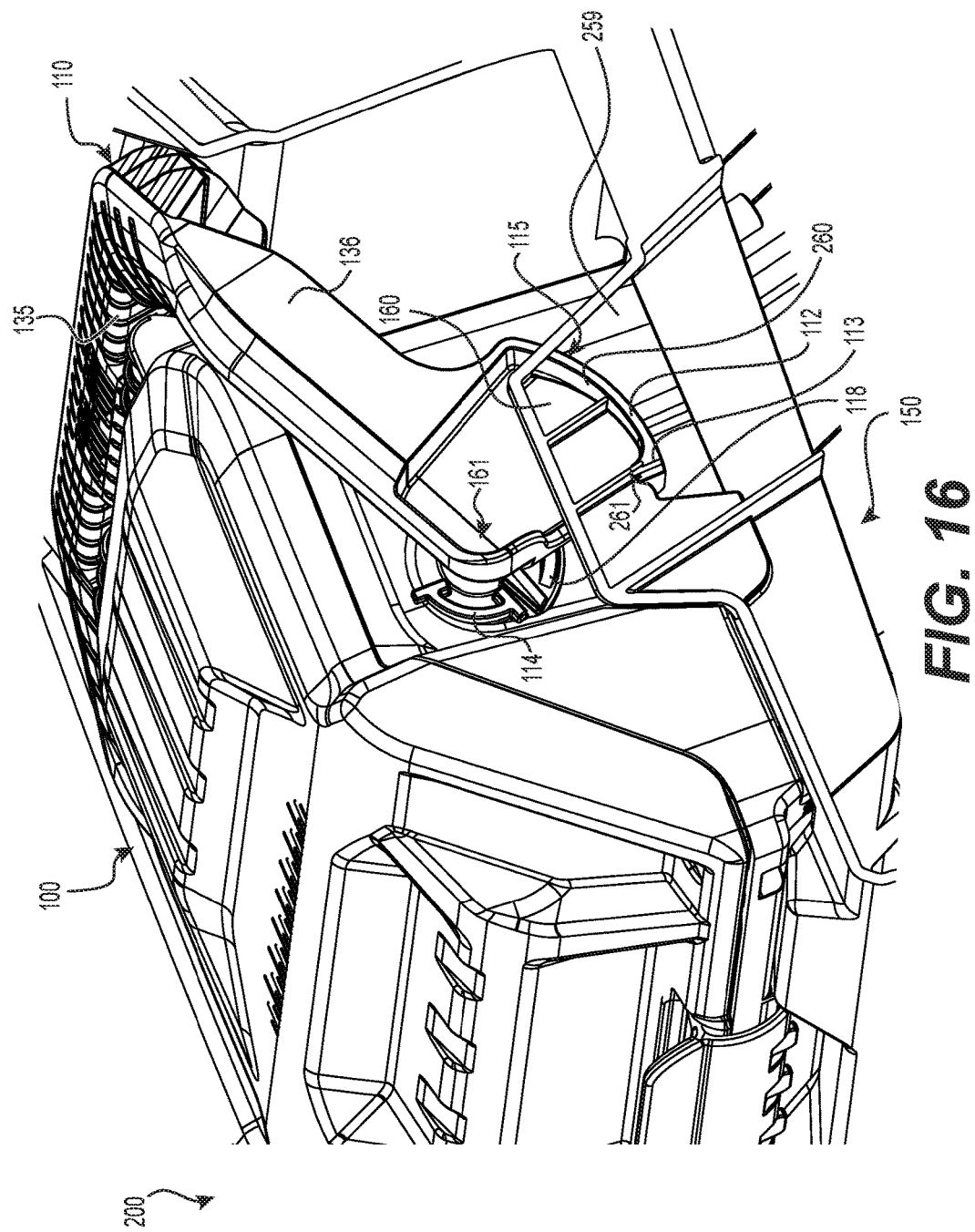
FIG. 16 is a close-up, perspective view, taken from the rear, right side, of the container assembly of FIG. 11C.
Figure 17:
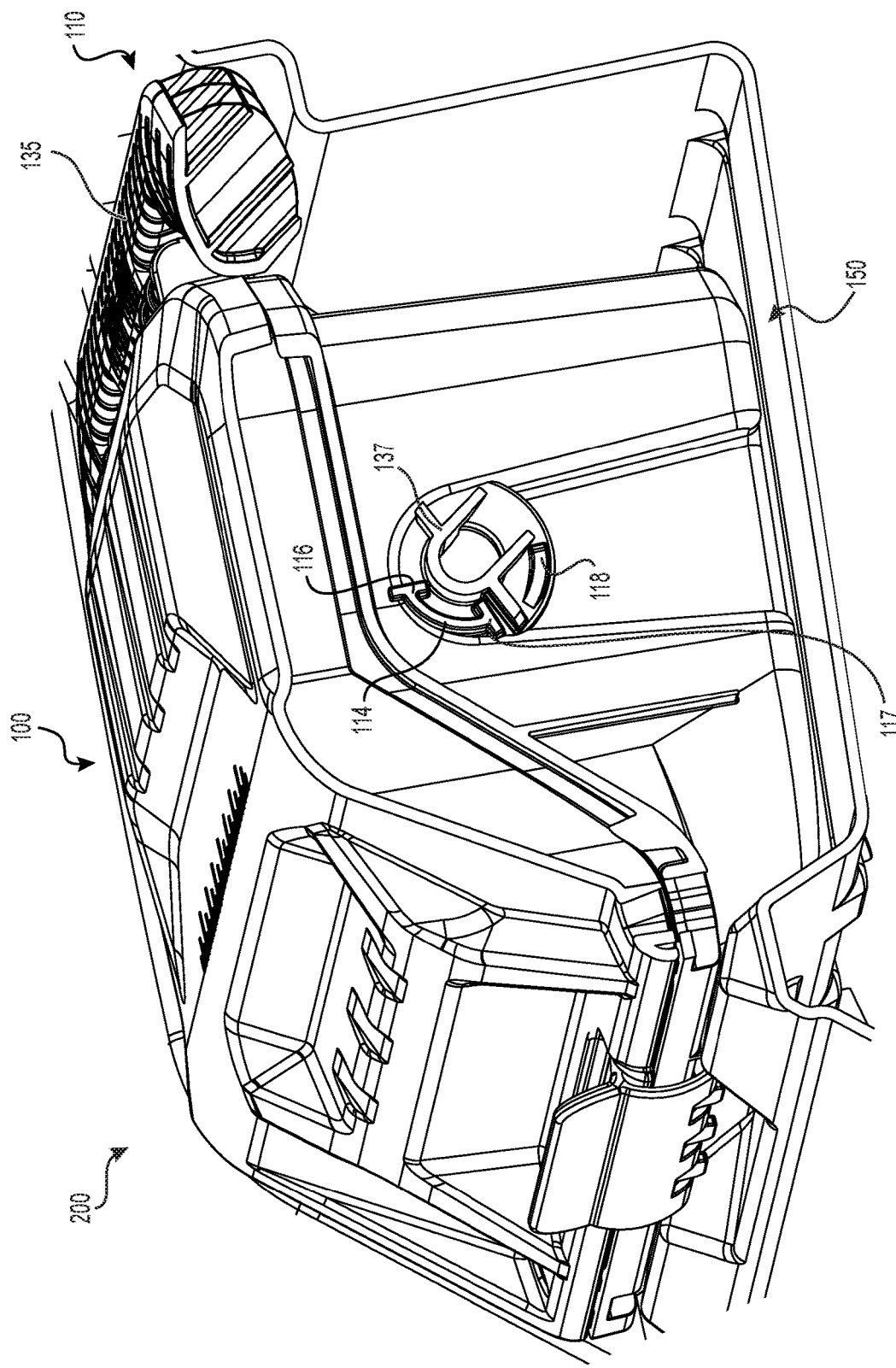
FIG. 17 is a close-up, perspective cross-sectional view, taken from the rear, right side, of the container assembly of FIG. 11C, with a portion of the container receiving base and the handle of the container removed.

The container body 101 includes a right handle stopper 114 on the right side 106 and a left handle stopper 114 on the left side 106 (see FIGS. 11C, 16 and 17). The right handle stopper 114 has a first portion 116 that impedes the end portion 137 of the right arm 136 of the handle 110 from moving past the unlocked position. The right handle stopper 114 also has second portion 117 that impedes an end portion 137 of the right arm 136 of the handle 110 from moving past the locked position. The left handle stopper 114 is a mirror image of the right handle stopper 114 and includes all the characteristics mentioned above.

It is contemplated that the container body 101 could have more or less than two handle stoppers 114, including, but not limited to, having no handle stoppers and one handle stopper. It is also contemplated that the first portion 116 and the second portion 117 of the right handle stopper 114 could be split into two separate handle stoppers, both disposed on the right side 106 (and similarly for the left handle stopper 114).

The container body 101 includes two ramps 118 for maintaining the handle 110 in the unlocked position, disposed on the left and right sides 106. The ramps 118 help maintain the handle 110 generally fixed in a vertical orientation while the removable container 100 is lifted or carried by a user. A portion of the handle 110 (not shown) deforms slightly in order to pass over the ramp 118, such that a minimum of force is required on the user's part to force the handle 110 out of the unlocked position. It is contemplated that the mechanism for impeding unwanted movement of the handle 110 could also include, but is not limited to, any mechanism or physical structure that keep the handle 110 from changing position without direct intervention from a user. It is also contemplated that a bump and dimple pair could be used to maintain the handle 110 in the locked and/or unlocked position. For example, a bump on the right or left arm 136 of the handle 110 would fit into a dimple on the container body 101 when the handle 110 is in the locked or unlocked position, necessitating a minimum amount of force from a user to push the bump out of the dimple to change the position of the handle 110. It is further contemplated that the dimple could be on the right or left arm 136 and the bump on the container body 101.

The removable container 100 is sized to accommodate tools for regular or emergency maintenance on a SSV vehicle. It is contemplated that the removable container 100 could be configured for other uses. For example, the container body 101 could be insulated and the removable container 100 used as a cooler for storing and transporting items to be kept cool, such as food or drinks. The lid 120 and the lid latch 122 could also be configured to close in such a way that water and dust are discouraged from entering the item receiving space 130, for example by having a seal along the edge of the lid 120. Use for such implementations could include, but are not limited to, the vehicle 10 used in adverse environmental conditions or adaptations of the present technology for use with a personal watercraft.

The method for securing the removable container 100 to the container receiving base 150 will now be described in detail, with respect to FIGS. 11A to 12 and 16. As the parts on the right side of the container assembly 200 are a mirror image of the parts located to the left side of the container assembly 200, the method will only be described with respect to the parts to the left side of the container assembly 200.

To secure the removable container 100 to the container receiving base 150, the removable container 100 is first placed on the container receiving base 150. In the unlocked position, the left arm 136 of the handle 110 is located in close proximity to the left receiving hook 160. Specifically, the left catch 115 is slightly above and forward of the left receiving hook 160 and no portion of the left arm 136 of the handle 110 descends lower than any top portion of the left receiving hook 160, as seen in FIG. 11B. As such, the receiving hooks 160 do not impede the removable container 100 from being placed on the container receiving base 150.

Next, the central portion 135 of the handle 110 is pushed forward and the handle 110 pivots about the pivot axis 162 passing through the right and left pivot points 161. An initial minimum amount of force must be applied by the user to move the handle 110 past the ramps 118 that helps maintain the handle in the unlocked position.

As the handle 110 turns, the left catch 115 rotates toward the rear side 103 of the container body 101, due to the L-shape of the left arm 135 of the handle 110. The left catch 115 passes into the left receiving space 259 and under the left receiving hook 160. The left receiving hook 160 has the corresponding arcuate portion 260 to accept the arcuate portion 112 of the left catch 115. As a result, the left catch 115 is received in the left catch receiving space 259 and the handle 110 is now in the locked position. As seen in FIGS. 11C and 16, the right and left catches 115 are engaged with the right and left receiving hooks 160 and the removable container 100 is secured to the container receiving base 150.

Upon rotation of the handle 110 to go into the locked position, the protrusion 113 is also pushed under the left receiving hook 160 where the left receiving hook 160 and/or the protrusion 113 deform slightly in order pass the protrusion 113 beneath the arcuate portion 260 of the left receiving hook 160. The protrusion 113 then slips into the indented portion 261 of the left receiving hook 160, the indented portion 261 being shaped to accept the protrusion 113. The protrusion 113 then impedes the handle 110 from moving out of the locked position, unless the user imparts a minimum of force in order to move the protrusion 113 out of the indented portion 261 and past the arcuate portion 260 of the left receiving hook 160.

The method for removing the removable container 100 that has been secured to the container receiving base 150 will now be described in detail with respect to FIGS. 11A to 12 and 16. As the parts on the right side of the container assembly 200 are a mirror image of the parts located to the left side of the container assembly 200, the method will only be described with respect to the parts to the left side of the container assembly 200.

First, the lid 120 is shut if it is open and the lid 120 is secured by the lid latch 122. Then, the central portion 135 of the handle 110 is pulled rearward and the handle 110 pivots about the pivot axis 162. An initial minimum amount of force must be applied by the user to move the protrusion 113 out of the indented portion 261 that helps maintain the handle 110 in the locked position.

As the handle 110 turns, the left catch 115 rotates toward the front side 105 of the container body 101, due to the L-shape of the left arm 135 of the handle 110. The left catch 115 passes out from under the left receiving hook 160. As a result, the left catch 115 is freed from the left catch receiving space 259. As seen in FIG. 11B, the left catch 115 is now located slightly above and forward of the left receiving hook 160.

The handle 110 is now in the unlocked position and the removable container 100 is no longer secured to the container receiving base 150. The central portion 135 of the handle 110 is over the top side 104 of the removable container 100. Finally, the user can lift the removable container 100 by the central portion 135 of the handle 110 to remove the removable container 100 (and its contents) from the container receiving base 150.

It is contemplated that the removable container 100 could include different forms of catches for securing to the container receiving base 150, including, but not limited to: more or less than two catches, one or more catches without arcuate portions and catches with more or less protrusions. It is also contemplated that the removable container base 150 could include different forms of receiving spaces for securing the removable container 100, including, but not limited to: differently shaped receiving spaces and one or more guide slots.

It is also contemplated that the removable container 100 could include one or more catch receiving spaces and the container receiving base 150 could include the corresponding one or more catches. An example of such an implementation of the present technology, a container assembly 200', will now be described with respect to FIGS. 18A to 18C. For simplicity, the components of the container assembly 200' which are similar in nature to the components of the container assembly 200 described above will be given the same reference numeral and will not be described again. It should be understood that their specific construction may vary.

As the parts on the right side of the container assembly 200' are a mirror image of the parts located to the left side of the container assembly 200', the method will only be described with respect to the parts to the left side of the container assembly 200'.

Figure 18B:
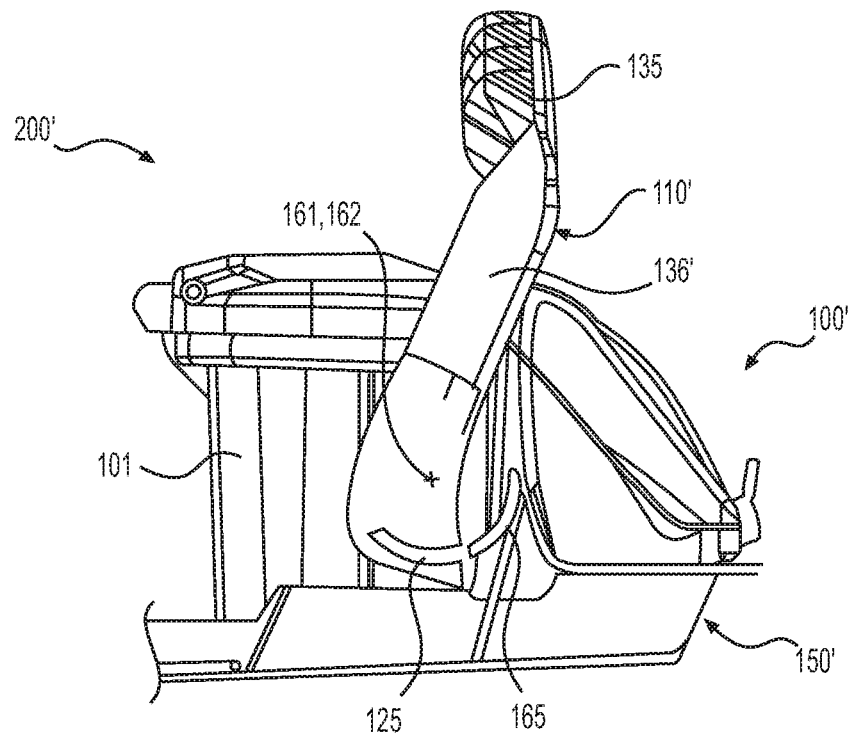
FIG. 18B is a left side elevation view of the removable container assembly, with the removable container resting on the container receiving base and the handle of the removable container in the unlocked position.
Figure 18C:
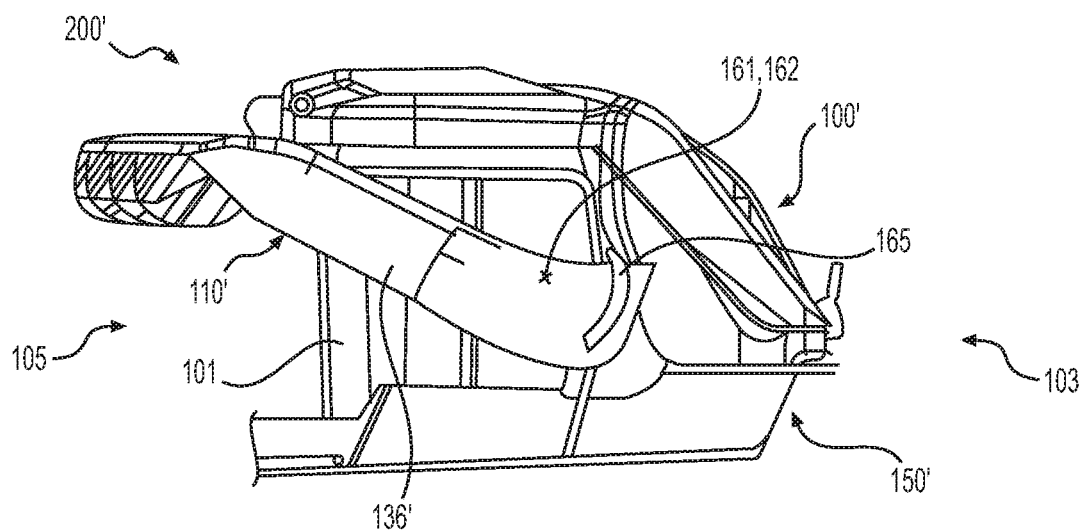
FIG. 18C is a left side elevation view of the removable container assembly, with the removable container resting on the container receiving base and the handle of the removable container in the unlocked position.

As illustrated in FIGS. 18A to 18C, the handle 110' has two catch receiving spaces, specifically a left side guide slot 125 and correspondingly the container receiving base 150' has a left catch 165. The left catch 165 is integrally connected to a left side of the container receiving base 150'. The left catch 165 is vertically oriented and located directly rearward of the handle 110' and the pivot point 161 when the removable container 100' is on the container receiving base 150'. The left guide slot 125 and the left catch 165 both have arcuate portions with a common center of curvature at the pivot point 161 (when the removable container 100' is on the container receiving base 150').

As the left catch 165 is located rearward of the handle 110' and the guide slot 125, the left arm 136' has a generally straight bar shape that extends below a top portion of the left catch 165. The removable container 100' is unimpeded from being placed on the container receiving base 150', as a bottom portion of the handle 110' is located forward of the left catch 165.

As with the described implementation above, the handle 110' is vertical in the unlocked position (see FIGS. 18A and 18B) and to the front side 105 of the container 100' when the handle 110' is in the locked position (see FIG. 18C).

To secure the removable container 100' to the container receiving base 150', the removable container 100' is first placed on the container receiving base 150'. In the unlocked position, the left arm 136' of the handle 110' is located in close proximity and forward of the left catch 165.

Next, the central portion 135 of the handle 110' is pushed forward and the handle 110' pivots about the pivot axis 162 at the left pivot point 161. As the handle 110' turns, the left guide slot 125 rotates toward the rear side 103 of the container body 101'. The left guide slot 125 passes around the left catch 165. As a result, the left catch 165 is received in the left guide slot 125 and the handle 110' is now in the locked position. As seen in FIG. 18C, the left catch 165 is engaged with the left guide slot 125 and the removable container 100' is secured to the container receiving base 150'.

To remove the removable container 100' from the container receiving base 150', the central portion 135 of the handle 110' is again pulled upward and rearward. As the handle 110' turns, the left guide slot 125 rotates toward the front side 105 of the container body 101'. As a result, the left catch 165 is freed from the left guide slot 125. As seen in FIG. 18B, the handle 110' and the left guide slot 125 are now located forward of the left catch 165.

The handle 110' is now in the unlocked position and the removable container 100' is no longer secured to the container receiving base 150'. The central portion 135 of the handle 110' is now over the top side 104 of the removable container 100'. Finally, the user can lift the removable container 100' by the central portion 135 of the handle 110' to remove the removable container 100' (and its contents) from the container receiving base 150'.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A removable container comprising:
a container body defining an item receiving space;
a handle pivotally connected to the container body and being movable between a locked position and an unlocked position, the handle having one of at least one catch and at least one catch receiving space, the one of the at least one catch and the at least one catch receiving space being movable with the handle and being configured to secure the removable container to a container receiving base when the handle is in the locked position.

2. The removable container of claim 1, wherein the one of the at least one catch and the at least one catch receiving space is the at least one catch.

3. The removable container of claim 2, wherein the at least one catch comprises two catches, the two catches being disposed on opposite sides of the container body.

4. The removable container of claim 2, further comprising a lid operatively connected to the container body and being movable between an open position providing access to the item receiving space and a closed position preventing access to the item receiving space.

5. The removable container of claim 2, wherein the handle is pivotally connected to two opposite sides of the container body.

6. The removable container of claim 2, wherein the at least one catch has an arcuate portion.

7. The removable container of claim 2, wherein:
when the handle is in the unlocked position, a portion of the handle extends over a top side of the container body; and
when the handle is in the locked position, a portion of the handle is disposed to one of a front and a rear of the container body.

8. The removable container of claim 2, wherein the container body further comprises a ramp disposed on a side wall of the container body, the handle moving over the ramp when the handle is moved between the locked and the unlocked positions.

9. The removable container of claim 2, further comprising at least one handle stopper disposed on the container body, the at least one handle stopper abutting the handle when the handle reaches at least one of the locked position and the unlocked position.

10. A container assembly for a vehicle comprising:
a container receiving base comprising one of at least one catch and at least one catch receiving space; and
a removable container selectively disposed on the container receiving base, the removable container comprising:
a container body defining an item receiving space, and
a handle pivotally connected to the container body and being movable between a locked position and an unlocked position, the handle having an other one of the at least one catch and the at least one catch receiving space, the other one of the at least one catch and the at least one catch receiving space being movable with the handle:
in the locked position, the at least one catch being received in the at least one catch receiving space, preventing the separation of the removable container from the container receiving base, and
in the unlocked position, the at least one catch being out of the at least one catch receiving space, allowing separation of the removable container from the container receiving base.

11. The container assembly of claim 10, wherein:
the one of the at least one catch and the at least one catch receiving space is the at least one catch receiving space, the at least one catch receiving space being defined in part by at least one receiving hook; and
the other one of the at least one catch and the at least one catch receiving space is the at least one catch.

12. The container assembly of claim 11, further comprising a lid operatively connected to the container body and being movable between an open position providing access to the item receiving space and a closed position preventing access to the item receiving space.

13. The container assembly of claim 11, wherein the at least one catch comprises two catches disposed on opposite sides of the container body.

14. The container assembly of claim 11, wherein the at least one catch has an arcuate portion.

15. The container assembly of claim 11, wherein the handle is pivotally connected to two opposite sides of the container body.

16. The container assembly of claim 11, wherein:
when the handle is in the unlocked position, a portion of the handle extends over a top side of the container body; and
when the handle is in the locked position, a portion of the handle is disposed to one of a front and a rear of the container body.

17. A vehicle comprising:
a vehicle body;
at least one seat connected to the vehicle body;
a motor connected to the vehicle body;
a container receiving base connected to the vehicle body, the container receiving base comprising one of at least one catch and at least one catch receiving space; and
a removable container selectively disposed on the container receiving base, the removable container comprising:
a container body defining an item receiving space,
a handle pivotally connected to the container body and being movable between a locked position and an unlocked position, the handle having an other one of the at least one catch and the at least one catch receiving space, the other one of the at least one catch and the at least one catch receiving space being movable with the handle:
in the locked position, the at least one catch being received in the at least one catch receiving space, preventing the separation of the removable container from the container receiving base, and in the unlocked position, the at least one catch being out of the at least one catch receiving space, allowing separation of the removable container from the container receiving base.

18. The vehicle of claim 17, wherein:

the one of the at least one catch and the at least one catch receiving space is the at least one catch receiving space, the at least one catch receiving space being defined in part by at least one receiving hook; and the other one of the at least one catch and the at least one catch receiving space is the at least one catch.

19. The vehicle of claim 18, further comprising a dashboard connected to the vehicle body and disposed forward of the at least one seat, the dashboard defining the container receiving base.

20. The vehicle of claim 18, further comprising a cargo box connected to the vehicle body, the cargo box defining the container receiving base.

\* \* \* \* \*

UNITED STATES PATENT AND TRADEMARK OFFICE
CERTIFICATE OF CORRECTION

PATENT NO. : 10,479,290 B2
APPLICATION NO. : 15/748850
DATED : November 19, 2019
INVENTOR(S) : Mikhael Simard et al.

It is certified that error appears in the above-identified patent and that said Letters Patent is hereby corrected as shown below:

On the Title Page

Under abstract "20 Claims, 21 Drawing Sheets" should read --18 Claims, 21 Drawing Sheets--

In the Claims

Claims 1 to 20, listed from Column 15, Line 21 to Column 17, Line 20, should be replaced and read as follows:

1. A removable container comprising:
    a container body defining an item receiving space; and
    a handle pivotally connected to the container body and being movable between a locked position and an unlocked position, the handle having one of at least one catch and at least one catch receiving space, the one of the at least one catch and the at least one catch receiving space being movable with the handle and being configured to secure the removable container to a container receiving base when the handle is in the locked position,
    a portion of the handle extending over a top side of the container body when the handle is in the unlocked position,
    a portion of the handle being disposed to one of a front and a rear of the container body when the handle is in the locked position.

2. The removable container of claim 1, wherein the one of the at least one catch and the at least one catch receiving space is the at least one catch.

3. The removable container of claim 2, wherein the at least one catch comprises two catches, the two catches being disposed on opposite sides of the container body.

4. The removable container of claim 2, further comprising a lid operatively connected to the container body and being movable between an open position providing access to the item receiving space and a closed position preventing access to the item receiving space.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*

5. The removable container of claim 2, wherein the handle is pivotally connected to two opposite sides of the container body.

6. The removable container of claim 2, wherein the at least one catch has an arcuate portion.

7. The removable container of claim 2, wherein the container body further comprises a ramp disposed on a side wall of the container body, the handle moving over the ramp when the handle is moved between the locked and the unlocked positions.

8. The removable container of claim 2, further comprising at least one handle stopper disposed on the container body, the at least one handle stopper abutting the handle when the handle reaches at least one of the locked position and the unlocked position.

9. A container assembly for a vehicle comprising:
    a container receiving base comprising one of at least one catch and at least one catch receiving space; and
    a removable container selectively disposed on the container receiving base, the removable container comprising:
        a container body defining an item receiving space, and
        a handle pivotally connected to the container body and being movable between a locked position and an unlocked position, the handle having an other one of the at least one catch and the at least one catch receiving space, the other one of the at least one catch and the at least one catch receiving space being movable with the handle:
            in the locked position,
                a portion of the handle being disposed to one of a front and a rear of the container body, and
                the at least one catch being received in the at least one catch receiving space, preventing the separation of the removable container from the container receiving base, and
            in the unlocked position,
                a portion of the handle extending over a top side of the container body, and
                the at least one catch being out of the at least one catch receiving space, allowing separation of the removable container from the container receiving base.

10. The container assembly of claim 9, wherein:
    the one of the at least one catch and the at least one catch receiving space is the at least one catch receiving space, the at least one catch receiving space being defined in part by at least one receiving hook; and
    the other one of the at least one catch and the at least one catch receiving space is the at least one catch.

11. The container assembly of claim 10, further comprising a lid operatively connected to the container body and being movable between an open position providing access to the item receiving space and a closed position preventing access to the item receiving space.

12. The container assembly of claim 10, wherein the at least one catch comprises two catches disposed on opposite sides of the container body.

13. The container assembly of claim 10, wherein the at least one catch has an arcuate portion.

14. The container assembly of claim 10, wherein the handle is pivotally connected to two opposite sides of the container body.

15. A vehicle comprising:
    a vehicle body;
    at least one seat connected to the vehicle body;
    a motor connected to the vehicle body;
    a container receiving base connected to the vehicle body, the container receiving base comprising one of at least one catch and at least one catch receiving space; and
    a removable container selectively disposed on the container receiving base, the removable container comprising:
        a container body defining an item receiving space,
        a handle pivotally connected to the container body and being movable between a locked position and an unlocked position, the handle having an other one of the at least one catch and the at least one catch receiving space, the other one of the at least one catch and the at least one catch receiving space being movable with the handle:
        in the locked position,
            a portion of the handle being disposed to one of a front and a rear of the container body, and
            the at least one catch being received in the at least one catch receiving space, preventing the separation of the removable container from the container receiving base, and
        in the unlocked position,
            a portion of the handle extending over a top side of the container body, and
            the at least one catch being out of the at least one catch receiving space, allowing separation of the removable container from the container receiving base.

16. The vehicle of claim 15, wherein:
    the one of the at least one catch and the at least one catch receiving space is the at least one catch receiving space, the at least one catch receiving space being defined in part by at least one receiving hook; and
    the other one of the at least one catch and the at least one catch receiving space is the at least one catch.

17. The vehicle of claim 16, further comprising a dashboard connected to the vehicle body and disposed forward of the at least one seat, the dashboard defining the container receiving base.

18. The vehicle of claim 16, further comprising a cargo box connected to the vehicle body, the cargo box defining the container receiving base.